United States Patent
Feit et al.

(10) Patent No.: US 12,227,209 B1
(45) Date of Patent: Feb. 18, 2025

(54) NORMALIZED OBJECT OCCUPANCY DETERMINATION

(71) Applicant: Zoox, Inc., Foster City, CA (US)

(72) Inventors: Andrew James Feit, Foster City, CA (US); Noureldin Ehab Hendy, Truckee, CA (US)

(73) Assignee: Zoox, Inc., Foster City, CA (US)

( * ) Notice: Subject to any disclaimer, the term of this patent is extended or adjusted under 35 U.S.C. 154(b) by 330 days.

(21) Appl. No.: 17/748,004

(22) Filed: May 18, 2022

(51) Int. Cl.
*G06N 20/00* (2019.01)
*B60W 60/00* (2020.01)
*G06V 10/44* (2022.01)

(52) U.S. Cl.
CPC ....... *B60W 60/00272* (2020.02); *G06N 20/00* (2019.01); *G06V 10/449* (2022.01); *B60W 2420/408* (2024.01); *B60W 2554/4041* (2020.02); *B60W 2554/80* (2020.02)

(58) Field of Classification Search
CPC ... B60W 60/00272; B60W 2554/4041; B60W 2554/80; B60W 2420/408; G06N 20/00; G06V 10/449
See application file for complete search history.

(56) References Cited

U.S. PATENT DOCUMENTS

2018/0345958 A1* 12/2018 Lo ............... G08G 1/096725
2021/0295171 A1* 9/2021 Kamenev ............ G06N 3/088

OTHER PUBLICATIONS

Noise reduction and image smoothing using Gaussian blur—Eswar et al. (Year: 2015).*

* cited by examiner

*Primary Examiner* — Jess Whittington
*Assistant Examiner* — Rami Nabih Bedewi
(74) *Attorney, Agent, or Firm* — Lee & Hayes, P.C.

(57) ABSTRACT

Techniques for accurately predicting and avoiding collisions with objects detected in an environment of a vehicle are discussed herein. A vehicle safety system can implement one or more models to output data indicating an intersection probability between the object and a portion of the vehicle in the future. The model may employ a blur filter to modify a representation of an object usable to determine the intersection probability. A vehicle can be controlled in an environment based at least in part on the intersection probability.

20 Claims, 6 Drawing Sheets

NORMALIZED OBJECT OCCUPANCY DETERMINATION

BACKGROUND

Planning systems in autonomous and semi-autonomous vehicles determine actions for a vehicle to take in an operating environment. Actions for a vehicle may be determined based in part on avoiding objects present in the environment. For example, an action may be generated by a planning system to yield to a pedestrian, to change a lane to avoid another vehicle in the road, or the like. Perception systems utilize sensor data from sensors to "see" the environment which enables the planning systems to determine an effect of a detected object on a potential action for the vehicle. However, the complexity of such systems may cause preclusion of inspecting the reliability of such systems, especially as applied in ever more complicated scenarios.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
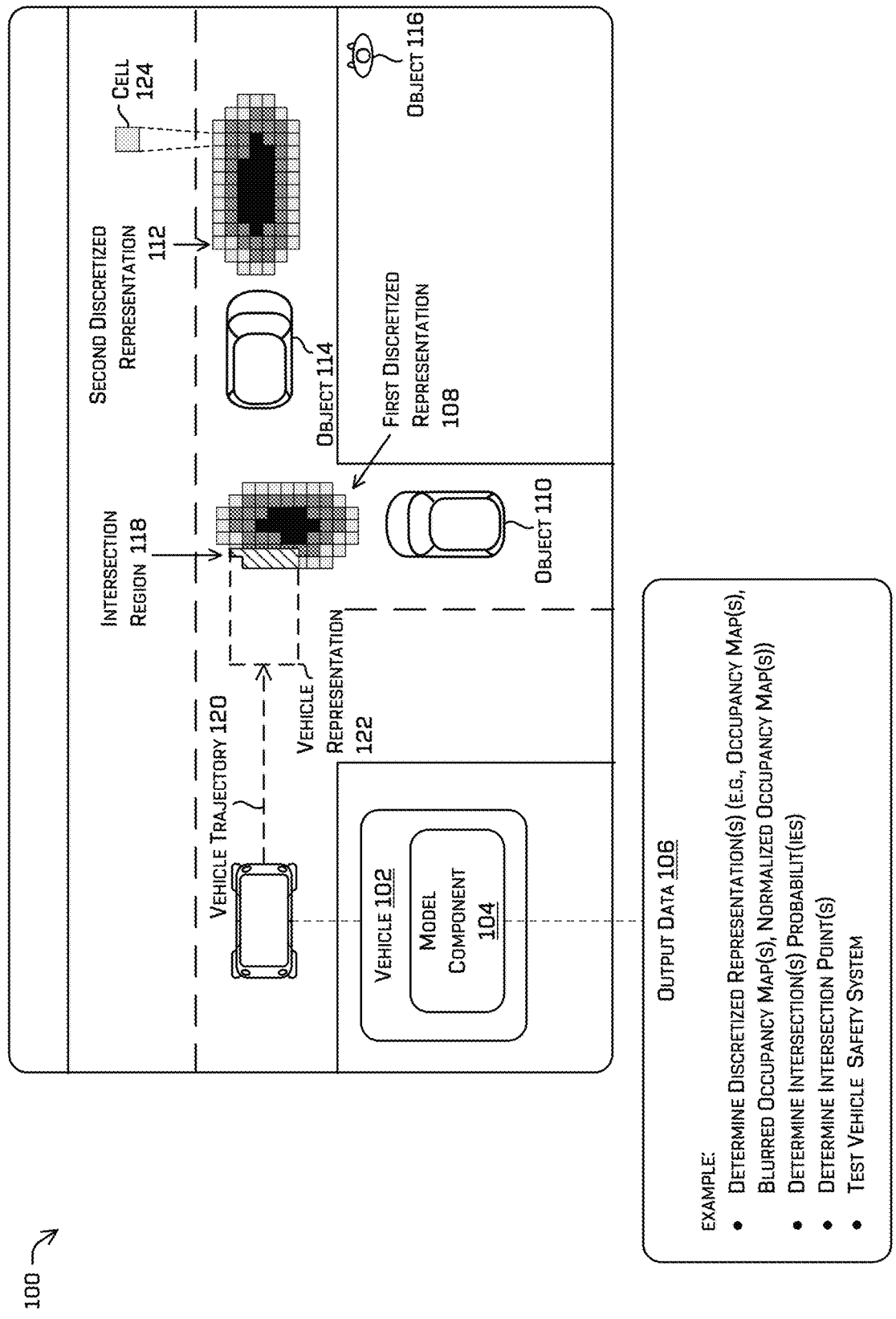
FIG. 1 is an illustration of an example environment, in which an example vehicle applies a model to predict occupancy of one or more example objects at a future time.

This disclosure relates to techniques for accurately predicting and avoiding collisions with objects detected in an environment of a vehicle. The vehicle may be an autonomous vehicle including one or more sensors to detect objects in the environment, though other vehicles are contemplated. The techniques can include a vehicle safety system that implements a model to output an occupancy prediction based at least in part on sensor data from the one or more sensors. In some examples, a same or different model can apply a blur filter to the occupancy prediction to generate a blurred occupancy prediction usable to determine an intersection probability between an object and a portion of the vehicle in the future. A vehicle computing device can be configured to control the vehicle to avoid the object based at least in part on the intersection probability. By implementing the model(s) as described herein, the vehicle safety system can more accurately determine occupancy maps that represent future positions of one or more objects, thereby improving the overall safety of the vehicle. Further, an output from the model(s) can be used to verify and/or validate predictions from the safety system to improve accuracy of the safety system, including quickly verifying that a trajectory of the vehicle will not result in an intersection with an object.

Generally, the model implemented by the safety system may provide functionality to generate data representing an occupancy prediction associated with an object in an environment of an autonomous vehicle. For example, the occupancy prediction output by the model can comprise an occupancy grid representing a probability of occupancy of pixels at a time, e.g., a future time, in the environment. The model can identify whether a portion of the occupancy grid overlaps with a portion of the vehicle (e.g., as may be estimated at that future time based on, for example, a determined trajectory) to determine whether the vehicle may potentially intersect with one or more objects associated with the occupancy grid. In various examples, the model can apply a blur filter (e.g., a Gaussian blur algorithm or a uniform blur algorithm) to generate a blurred occupancy grid usable to determine an intersection probability between the object and the autonomous vehicle at an intersection point at a future time. In some examples, while occupancy grid may not identify individual objects, applying a blur filter can function as an operations to normalize occupancy predictions on a per-object basis. In some examples, such blur operations can alter diffuse occupancy predictions to more accurately make predictions about dynamic objects in an environment. In some examples, the model can send the intersection probability associated with a potential intersection to a vehicle computing device that is configured to control the vehicle while it navigates in the environment. By implementing a model that applies the blur filter as described herein, more accurate occupancy predictions and/or object representations can be determined (versus not implementing the model) thereby improving predictions of intersections (e.g., collisions) at an intersection point in the future.

In some examples, the model can determine a normalized occupancy prediction based at least in part on comparing the occupancy prediction and the blurred occupancy prediction. In some examples, the normalized occupancy prediction can be determined by dividing a value associated with the occupancy prediction (e.g., a value of one or more pixels in an occupancy map) by a value associated with the blurred occupancy prediction (e.g., a value of one or more pixels in a blurred occupancy map). For instance, the model can compare a first intensity value associated with the occupancy prediction to a second intensity value associated with the blurred occupancy prediction, and output a normalized occupancy prediction (e.g., a normalized occupancy map of pixels) based at least in part on the comparison. In at least some examples, such a normalization may be on a per object basis. In various examples, such normalization may be performed across the entire detected scene.

In various examples, the occupancy prediction, the blurred occupancy prediction, and the normalized occupancy prediction can represent different discretized representations of an environment of the vehicle. In some examples, the discretized representations associated with the occupancy prediction, the blurred occupancy prediction, and/or the normalized occupancy prediction can vary in size. For instance, the normalized discretized representation can have a larger area than the discretized representation. In this way, an intersection probability determined from the normalized occupancy prediction may be more conservative than an intersection probability determined solely from the occupancy prediction. In some examples, this can result the vehicle receiving improved intersection probabilities by identifying a potential intersection that would otherwise not be identified.

In some examples, the model can determine whether pixels of the normalized occupancy prediction (e.g., a normalized occupancy map) overlap with pixels of a vehicle representation, such as at a time associated with the occupancy prediction. The model can, for example, determine an intersection probability based at least in part on an overlap between an area of the normalized occupancy map and an area of the vehicle representation (vehicle footprint, representative bounding box, etc.). In some examples, the model can output an indication of the overlap (e.g., the intersection probability) to the vehicle computing device to cause the vehicle to initiate an action to avoid an area in the environment associated with the overlap.

In some examples, the techniques described herein can include a safety system that implements a model to determine occupancy predictions usable by a vehicle computing device that controls a vehicle (e.g., control a steering action, a braking action, an acceleration action, and so on). For instance, the vehicle computing device can receive intersection information (e.g., intersection probabilities) from the safety system for use in planning operations, such as determining a candidate trajectory for the vehicle. In various examples, the vehicle may receive indications of potential intersection(s) with object(s) usable by the vehicle to quickly and/or preemptively avoid objects, thereby improving safety of the vehicle. In some examples, the model can determine a potential intersection for sending to the vehicle computing device to reduce false positives which otherwise utilize computational resources to determine that the potential intersection did not occur or was unavoidable. Accordingly, implementing the techniques described herein can efficiently make use of available computational resources (e.g., memory and/or processor allocation or usage) while also improving accuracy of predictions.

In various examples, scenarios may be generated by a same or different model that receives data representing one or more occupancy predictions, object information (a speed of the object, an acceleration of the object, a yaw of the object, etc.) and/or vehicle information (e.g., a speed of the vehicle, a trajectory of the vehicle, etc.). The scenarios generated by the model can represent a scenario (e.g., a simulation) between one or more objects and the vehicle. In various examples, the model can predict object occupancy and/or a predicted velocity or position of the object based at least in part on receiving top-down multi-channel data indicative of a top-down representation of an environment (e.g., wherein each channel or layer comprises data about the scene). The top-down representation may be determined based at least in part on map data and/or sensor data (e.g., lidar data, radar data, image data, etc.) captured from or associated with a sensor of an autonomous vehicle in the environment, and may represent a top-down view of the environment to capture context of the autonomous vehicle (e.g., identify actions of other objects such as vehicles and pedestrians relative to the vehicle). In some examples, such channels may represent, for example, occupancy, speed, lane indications, speed limits, traffic control, object type, etc.

As mentioned, the model may also or instead determine an occupancy prediction and/or an intersection probability based at least in part on an occupancy grid comprising a plurality of grid points (discretizations) representing pixels in the environment. In various examples, the model can process intensity values, average intensity of neighboring pixels, and so on, to determine a response to the scenario by a vehicle safety system. Additionally, or alternatively, an intensity of pixels associated with the occupancy prediction output by the model can be increased and/or decreased prior to and/or after applying the blur filter. For instance, intensity values of one or more pixels in the occupancy prediction (e.g., the occupancy map) can be increased (e.g., a power factor can be applied), the blur filter can be applied, then the intensity values can be decreased (e.g., an inverse power can be applied). Additional details for determining occupancy predictions, blurred occupancy predictions, and/or intersection probabilities are described herein, including in relation to FIGS. 2 and 3.

In some examples, the vehicle may comprise an autonomous or semi-autonomous vehicle with a vehicle computing device configured to receive sensor data from one or more sensors of the vehicle. The vehicle may detect objects using one or more sensors while navigating in the environment. The objects may include static objects (e.g., ground level, buildings, bridges, signs, etc.) and dynamic objects such as other vehicles (e.g., cars, trucks, motorcycles, mopeds, etc.), pedestrians, bicyclists, or the like. In some examples, the objects may be detected based on sensor data from sensors (e.g., cameras, motion detectors, lidar sensors, radar sensors, etc.) of the vehicle. As yet another example, the objects may be detected based on sensor data received from remote sensors, such as, for example, sensors associated with another vehicle or sensors situated in the environment that are configured to share data with a plurality of vehicles. Sensor data representing the detected objects may be used to determine input data usable by the model to predict an intersection probability associated with the object.

In some examples, the vehicle may comprise a vehicle safety system implemented separately from the vehicle computing device for improved performance of the vehicle safety system, and/or to provide redundancy, error checking, and/or validation of determinations and/or commands determined by the vehicle computing device. However, in other examples, the vehicle safety system may be implemented as one or more components within the same vehicle computing device. Additional examples of a vehicle architecture comprising a primary computing system and a secondary computing system can be found, for example, in U.S. patent application Ser. No. 16/218,182 titled "Collision Avoidance System with Trajectory Validation" filed Dec. 12, 2018, U.S. patent application Ser. No. 16/232,863 titled "Collision Avoidance System" filed Dec. 26, 2018, and U.S. patent application Ser. No. 16/588,529 titled "Collision Avoidance Perception System" filed Sep. 30, 2019, the entirety of which are herein incorporated by reference in their entirety.

By way of example, the vehicle computing device may be considered to be a primary system, while the vehicle safety system may be considered to be a secondary system. The primary system may generally perform processing to control how the vehicle maneuvers within an environment. The primary system may implement various artificial intelligence (AI) techniques, such as machine learning, to understand an environment around the vehicle and/or instruct the vehicle to move within the environment. For example, the primary system may implement the AI techniques to localize the vehicle, detect objects around the vehicle, segment sensor data, determine classifications of the objects, predict object tracks, generate trajectories for the vehicle and the objects around the vehicle, and so on.

In some examples, the vehicle safety system may operate as a separate system that receives input data (e.g., perception data) based on the sensor data and AI techniques implemented by the primary system (e.g., vehicle computing device), and may perform various techniques described herein for improving collision prediction and avoidance by a vehicle. By way of example and not limitation, to enable the vehicle to respond quickly and accurately to objects, the model may send intersection information (e.g., intersection probabilities) to a planning component configured to plan or otherwise determine a trajectory for the vehicle and/or to a perception component configured to sense the environment. In this way, intersection information from the model can be considered during planning operations (e.g., to avoid the object) and/or during perception operations (e.g., to direct one or more sensors to capture a different level of perception for an object).

A vehicle computing device may allocate an amount of memory, a type of memory, and/or a memory location to make the best use of available memory resources to models that predict possible intersections between object(s) and the vehicle. In some examples, models may make use of memory resources that are remote from the vehicle (e.g., a remote server or a remote vehicle).

In some examples, a model may define processing resources (e.g., processor amount, processor cycles, processor cores, processor location, processor type, and the like) to use to predict intersection probabilities, occupancy grids, etc. A vehicle computing device that implements a model may have different processors (e.g., Central Processing Units (CPUs), Graphics Processing Units (GPUs), multi-core processor, and the like). Models may define processing resources to utilize a processor that most efficiently (e.g., uses the least amount of computational time) outputs a prediction. In some examples, models may predict intersection values by processing the object using a GPU, CPU, or a combination thereof. In this way, the model may be defined to utilize the processing resources that enable the model to perform predictions in the least amount of time (e.g., to use the intersection values in planning considerations of the vehicle). Accordingly, a model may make the best use of available processing resources and enable more predictions that may improve how a vehicle navigates in relation to the objects.

As described herein, models may be representative of machine learned models, statistical models, heuristic models, or a combination thereof. That is, a model may refer to a machine learning model that learns from a training data set to improve accuracy of an output (e.g., a prediction). Additionally, or alternatively, a model may refer to a statistical model that is representative of logic and/or mathematical functions that generate approximations which are usable to make predictions. In one specific example, a first model can be a machine learned model outputting an occupancy prediction, and a second model can be a statistical model that applies a blur filter to the occupancy prediction.

The techniques discussed herein can improve a functioning of a computing device of a vehicle in a number of ways. For example, the model can employ blur filter functioning as a per-agent operator on an occupancy prediction which does not uniquely identify objects. By implementing the model, processing on diffuse predictions is improved while also avoiding false negative interactions. Further, the model may act as an attention system (e.g., a vehicle safety system and/or a redundancy to an existing perception component) that detects previously undetected objects, decreases false positives, prevents unneeded actions by the vehicle, and/or improves predictions related to the behavior of the vehicle. In some examples, the model can improve functioning and safety of the vehicle by preventing the vehicle from taking additional actions that are not required based on conditions in the environment around the vehicle. In addition, the techniques described herein can improve passenger comfort and/or vehicle safety such as, for example, avoiding sudden braking or swerving when not needed. The techniques can include the model optimizing available computational resources by performing operations that limit the impact on the available resources (as compared to not implementing the model). Utilizing intersection probabilities (e.g., intersection data) by a vehicle computing device, for instance, can improve the accuracy and/or reduce a latency for the vehicle to respond to a potential collision in the environment.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using sensor data. Additionally, the techniques described herein can be used with real data (e.g., captured using sensor(s)), simulated data (e.g., generated by a simulator), or any combination of the two.

FIG. 1 is an illustration of an autonomous vehicle (vehicle 102) in an environment 100, in which an example model (model component 104) may determine one or more occupancy predictions (output data 106). A vehicle computing device (e.g., vehicle computing device 404) and/or a vehicle safety system (e.g., vehicle safety system 434) may implement the model component 104 of the vehicle 102. While described as a separate system, in some examples, intersection techniques described herein may be implemented by other vehicle systems, components, and/or computing devices. For example, and as will be described in further detail with regard to FIG. 4, the occupancy prediction techniques described herein may be implemented at least partially by or in association with a localization component 420, a perception component 422, and/or a planning component 424.

In various examples, the vehicle safety system may be configured to receive sensor data representing object(s) of the environment 100, such as via a perception component (e.g., the perception component 422). In some examples, the vehicle safety system may detect, infer, estimate, or otherwise determine occupancy predictions representing an occupancy map (also referred to as an occupancy grid) of the environment 100. For example, the model component 104 can receive the sensor data and determine a first discretized representation 108 representing a first probability that an object 110 (e.g., a first vehicle) occupies a first area of the environment at a future time, and a second discretized representation 112 representing a second probability that an object 114 (e.g., a second vehicle) occupies a second area of the environment at the future time. In some examples, the sensor(s) may include sensors mounted on the vehicle 102, and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In some examples, the sensor(s) may include one or more remote sensors, such as, for example sensors mounted on another autonomous vehicle, and/or sensors mounted in the environment 100. In various examples, the vehicle 102 may be configured to transmit and/or receive data from other autonomous vehicles. The data may include sensor data, object state data, and/or vehicle state data, such as sensor data associated with the environment 100.

In some examples, the vehicle safety system may be configured to detect an object in the environment 100, such as the object 110 and the object 114 (e.g., vehicles) and object 116 (e.g., a pedestrian). In some examples, the vehicle safety system may be configured to receive, detect, infer, estimate, or otherwise determine occupancy predictions for each detected object. As shown in FIG. 1, the object 110 is associated with the first discretized representation 108 and the object 114 is associated with the second discretized representation 112 using the model component 104. However, in other examples the discretized representation(s) may represent probabilities of an regions(s) potentially including one or more objects in the environment 100 (rather than a specific object). In some examples, the model component 104 may represent a machine learned model that predicts occupancy based at least in part on the sensor data.

The output data 106 can include one or more discretized representations including the discretized representation 108, the second discretized representation 112, though others may also be included. A discretized representation can represent occupancy predictions associated with an occupancy map, a blurred occupancy map, or a normalized occupancy map. The occupancy map can be output by the model component 104 and further processed by a same or different component or model to determine a blurred occupancy map. For instance, the model component 104 (or other model) can apply a blur filter (e.g., a Gaussian blur algorithm, a uniform blur algorithm, performing an average of nearest neighbors/next nearest neighbors, etc.) to one or more pixels (i.e., discrete regions) of the occupancy map to generate the blurred occupancy map. In some examples, the model component 104 (or other model) can output a normalized occupancy map representing a normalized occupancy prediction by comparing the occupancy prediction (or map) with the blurred occupancy prediction (or map). For example, values of pixel(s) in the occupancy prediction map can be divided by values of pixel(s) in the blurred occupancy map to generate or otherwise determine the normalized occupancy map. Additional details for determining occupancy predictions, blurred occupancy predictions, and/or normalized occupancy predictions are described herein, including in relation to FIGS. 2 and 3.

In some examples, the model component 104 may determine an intersection region 118 between a portion of the first discretized representation 108 and/or a portion of the second discretized representation 112, and a portion of a vehicle representation 120 along a vehicle trajectory 122. The vehicle trajectory 122 can represent a predicted or planned trajectory for the vehicle 102 to navigate in the environment 100 in the future. In such examples, the intersection region 118 output by the model component 104 may indicate a potential intersection between the vehicle 110 and the vehicle 102. In various examples, data output by the model component 104 can indicate an intersection probability that the vehicle 110 intersects with a portion of the vehicle 102 (or the vehicle 114, the pedestrian 116, or another object). In various examples, the intersection region 118 can comprise one or more pixels, data points, etc. associated with a respective discretized representation that overlap with one or more pixels, data points, etc. associated with the vehicle representation 120. In some examples, the vehicle representation 120 can occupy different areas or positions along the vehicle trajectory 122 over time. For example, vehicle representations can be reproduced at positions along the vehicle trajectory 122 every 0.1 seconds up to 4 seconds, or some other time interval.

As illustrated in FIG. 1, the first discretized representation 108 and the second discretized representation 112 can comprise one or more cells (e.g., cell 124) representing a probability value for the vehicle 110, the vehicle 114, or another object, to occupy the respective cell. For instance, each discretized representation can be associated with a respective set of probabilities. Probabilities associated with the first discretized representation 108 can represent a weight for the vehicle 110 to occupy the cell. In various examples, the model component 104 can compare each cell to a threshold to determine the discretized representation which is usable to determine a vehicle action.

FIG. 1 shows shading in the first discretized representation 108 and the second discretized representation 112 to convey the value for each cell. For instance, darker shading may indicate relatively higher values for the vehicle 110 to occupy a cell relative to lighter shading which can correspond to relatively lower values. In some examples, shading in FIG. 1 represents different probabilities associated with cells, which can change over time depending at least in part upon a location of the vehicle 102 (and a new position of the associated sensors). In some examples, probabilities associated with cells can be based at least in part on accessibility of the cell to the vehicles 110, the vehicle 114, etc., as discussed herein.

In some examples, a vehicle computing device may control the vehicle 102 in the environment 100 based at least in part on the output data 106 (e.g., one or more intersection probabilities). The vehicle computing device can be configured to determine an action to avoid objects in the environment 100 by implementing a component to process an intersection probability received from the model component 104. For instance, the model component 104 may provide functionality of an attention system (e.g., a computing system in addition to a main computing system which may provide additional and/or redundant safety systems) for the vehicle 102 by identifying regions and/or objects most likely to cause an intersection and communicating intersection information about the identified regions and/or objects to other components of the vehicle computing device. Accordingly, the intersection probability (e.g., a likelihood of an intersection between object(s) and the vehicle) may be taken into account in operations (e.g., simulations, estimated states, interaction modeling, collision estimation, etc.) or other vehicle control planning operation (e.g., as determined by a planning component) to quickly and/or preemptively avoid objects, thereby improving safety of the vehicle. Additional detail for determining and utilizing intersection probabilities are discussed throughout this disclosure.

The model component 104 can receive a variety of input data for processing including receiving sensor data that represents one or more two-dimensional representations of the environment of the vehicle 102. For example, as part of "pre-processing" the sensor data for use as input data, a model of a vehicle safety system may associate sensor data (or portions thereof) with two-dimensional representations to achieve a desired input data size for more efficient processing. The two-dimensional data representation (also referred to as a two-dimensional representation or a 2D space) may include a vector representation (not shown) and/or a top-down representation of the environment. In such examples, data may be encoded into a multi-channel two-dimensional representation in which each channel comprises different data of the environment creating what may be referred to herein as top-down image data. In various examples, a machine learned model can determine the input data based at least in part on down sampling and/or up sampling portions of the sensor data to achieve a desired resolution or data size for the input data. For example, lidar data, radar data, or other types of data included as part of the sensor data may be modified for use as input data (e.g., reduced in size and/or resolution) into a model that determines the output data 106.

In some examples, the input data can comprise image data, lidar data, radar data, data point information (e.g., a distance from the vehicle, an azimuth angle relative to the vehicle, intensity, coordinate values, velocity, and so on), vehicle information (e.g., a planned trajectory of the vehicle, position, orientation, steering wheel angle, and so on), object information (e.g., classification (car, truck, pedestrian, bicyclist, etc.) a predicted velocity, trajectory, position, orientation, and so on), environmental information (e.g., weather conditions, elevation, and the like), and/or parameter information (e.g., one or more parameters associated with an algorithm to be implemented by the model).

In various examples, the model may provide an output representing an intersection probability based at least in part on different types of input data. To illustrate, consider the following non-limiting example in which a vehicle navigates an environment and detects potential objects in the environment. In such an example, the model component 104 may receive input data representing object state data (e.g., position data, orientation data, heading data, velocity data, speed data, acceleration data, yaw rate data, or turning rate data associated with the object) and/or vehicle state data (e.g., position data, orientation data, heading data, velocity data, speed data, acceleration data, yaw rate data, or turning rate data associated with the vehicle), and determine the output data 106 indicating whether the vehicle 110 is likely to intersect with the vehicle 102. The data input into the model component 104 may include, in some examples, lidar data or top-down multi-channel "image" data indicative of a top-down representation of an environment. The model component 104 may also or instead determine an intersection probability based at least in part on an occupancy grid (e.g., the first discretized representation 108, the second discretized representation 112, etc.) comprising a plurality of grid points representing pixels in the environment. As a non-limiting example, the model component 104 may output one or more occupancy grids corresponding to one or more times in the future. If a grid portion overlaps with a known or expected position of the vehicle at that future time, an intersection (collision) may be determined. In various examples, the model component 104 can process the velocities, trajectories, etc. of the object(s) and the vehicle 102 to determine a response to a simulation by a vehicle safety system.

The output data 106 from the model component 104 can be used by a vehicle computing device in a variety of ways. For instance, the model component 104 can determine a blurred occupancy map and/or a normalized occupancy map, and determine whether a portion of the blurred occupancy map and/or the normalized occupancy map overlap with the vehicle representation 120 at a particular time. The model component 104 can, for example, determine an intersection probability between the vehicle 102 and an object associated with the blurred occupancy map and/or the normalized occupancy. In some examples, the model component 104 can determine, based at least in part on the output data 106 (e.g., intersection probabilities, etc.), to send a signal indicative of a potential intersection to a planning component (e.g., planning component 424) of the vehicle computing device to control the vehicle 102 in the environment 100 (e.g., determine a candidate vehicle trajectory and/or control a propulsion system, a braking system, or a steering system). The output data 106 may also or instead be used to perform a simulation by setting up conditions (e.g., an intersection, a number of objects, a likelihood for the object to exhibit abnormal behavior, etc.) for use during the simulation (e.g., by a vehicle computing device or computing device remote from the vehicle) in order to predict motion associated with object(s) in the environment. Additional examples of a vehicle architecture determining intersection probabilities can be found, for example, in U.S. patent application Ser. No. 16/591,418 titled "Collision Avoidance Perception System" filed Oct. 2, 2019, the entirety of which is herein incorporated by reference in its entirety.

A training component of a remote computing device, such as the computing device(s) 450 (not shown) and/or the vehicle computing device(s) 404 (not shown) may be implemented to train the model component 104. Training data may include a wide variety of data, such as image data, video data, lidar data, radar data, audio data, other sensor data, etc., that is associated with a value (e.g., a desired classification, inference, prediction, known position, etc.). Such data and associated values may generally be referred to as a "ground truth." To illustrate, the training data may be used for image classification and, as such, may include an image of an environment that is captured by an autonomous vehicle and that is associated with one or more classifications, occupancy predictions, etc. In some examples, such a classification and/or occupancy predictions may be based on user input (e.g., user input indicating that the image depicts a specific type of object), may be based on the output of another machine learned model, or based on measured occupancy from previously generated simulated or real data logs. In some examples, such labeled classifications (or more generally, the labeled output associated with training data) may be referred to as ground truth.

Figure 2:
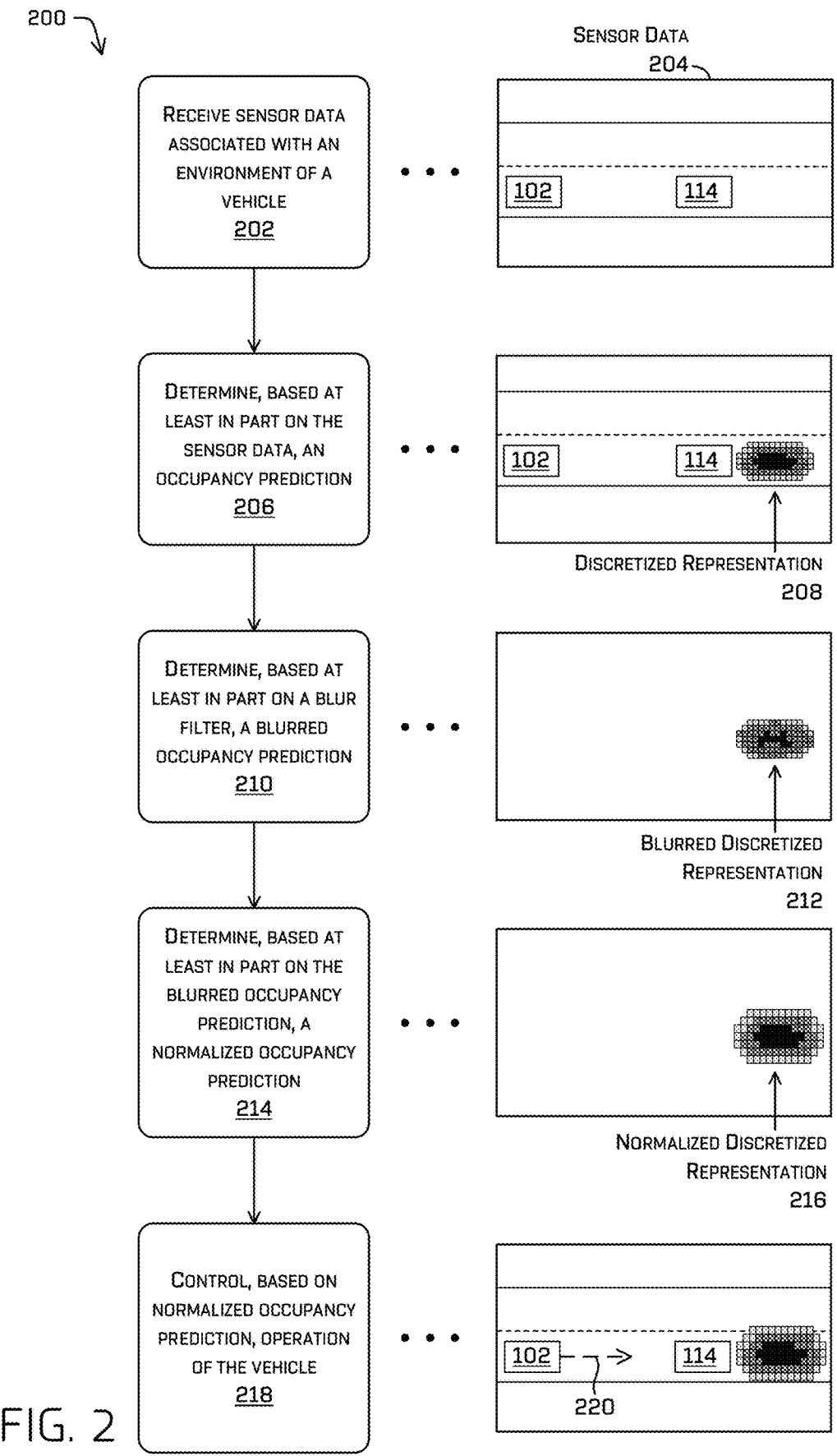
FIG. 2 is a pictorial flow diagram of an example process for controlling an example vehicle based on a normalized occupancy prediction output from a model.

FIG. 2 is a pictorial flow diagram of an example process 200 for controlling a vehicle (e.g., vehicle 102 or vehicle 402) based on a normalized occupancy prediction output from a model. The example process 200 may be implemented by a computing device such as the vehicle computing device 404 and/or the vehicle safety system 434 of FIG. 4.

An operation 202 can include receiving sensor data associated with an environment of a vehicle. For example, the operation 202 can include the vehicle 102 receiving sensor data 204 representing the environment 100 which includes one or more objects (the vehicle 114). In some examples, the operation 202 can include receiving the sensor data 204 from a plurality of sensors associated with the vehicle 102 and/or sensors remote from the vehicle 102 (e.g., sensors located in the environment 100 and/or another vehicle). The sensor data can include, for instance, lidar data which can be processed to represent top-down multi-channel data indicative of a top-down representation of an environment. In some examples, the operation 202 can be performed by an autonomous vehicle as it traverses the environment 100.

Generally, the top-down representation input into the model component 104 can represent an area around the vehicle 102. In some examples, the area can be based at least in part on an area visible to sensors (e.g., a sensor range), a receding horizon, an area associated with an action (e.g., traversing through an intersection), and the like. In some examples, the top-down representation may represent a 100 meter×100 meter area around the vehicle 102, although any area is contemplated. In various examples, the top-down representation may be determined based at least in part on map data and/or sensor data captured from or associated with a sensor of the autonomous vehicle 102 in the environment.

In various examples, the top-down representation of the environment may be representative of a top-down perspective of the environment and may comprise one or more multi-channel image(s) such as a first channel, a second channel, and a third channel. The computing device can generate or determine the multi-channel image(s) to represent different attributes of the environment with different channel images. For instance, an image having multiple channels, wherein each channel is representative of some information (semantic or otherwise). In some examples, one of the channel images can represent an object position, a feature of the environment, an object velocity, an object heading, an object acceleration, an object yaw, an attribute of the object, a vehicle velocity, crosswalk permission (e.g., a crosswalk light or audio state), and traffic light permissibility (e.g., a traffic light state), just to name a few. In this way, the top-down representation can represent objects in the environment (e.g., represented by a bounding box, as discussed herein), semantic information about the object (e.g., a classification type), movement information (e.g., velocity information, acceleration information, etc.), and the like.

An operation 206 can include determining, based at least in part on the sensor data, an occupancy prediction. For example, the operation 206 can include the vehicle 102 implementing the model component 104 to determine a discretized representation 208 that comprises prediction probabilities indicating portions of the environment 100 likely to include an object. FIG. 2 shows the discretized representation 208 corresponding generally to a region in the environment 100 that the vehicle 114 can occupy in the future, though in other examples the discretized representation 208 may also or instead represent other objects. Further description of discretized representations can be found throughout this disclosure.

In some examples, the discretized representation 208 can comprise cells (e.g., the cell 124, pixels, or otherwise discrete areas) associated with a different probabilities for whether or not an area of the cell comprises an object. FIG. 2 shows shading in the discretized representation 208 to convey the prediction probabilities for each cell. For instance, darker shading may indicate a stronger likelihood that an object occupies the cell relative to lighter shading of other cells.

In some examples, the operation 206 can include the model component 104 determining multiple different discretized representations over time. For example, the model component 104 can determine one or more discretized representations at a first time $T_1$, at a later time $T_2$, etc. to represent potential occupancy of object(s) at different times in the future. In examples having multiple discretized representations representing different times, the model component 104 can output an indication of a potential intersection based at least in part on detecting a first instance of an overlap between a pixel or data point of a discretized representation and a pixel or data point of the vehicle representation 120. In some examples, the model component 104 can output an indication of a potential intersection based at least in part on a maximum pixel value of the pixels in the overlap area. The indication of the potential intersection may also be based at least in part on whether the maximum pixel value is above a pixel threshold value (or average of maximum values across multiple pixels). In some examples, the model component 104 can aggregate the potential intersections and respective times and send indications of the potential interaction(s) closest to the vehicle to another component of a vehicle computing device to cause the vehicle to plan a trajectory to avoid the object. For example, model component 104 can identify the potential interactions for sending to other components based at least in part on a distance between the vehicle and a boundary of the discretized representation.

An operation 210 can include determining, based at least in part on a blur filter, a blurred occupancy prediction. For example, the operation 210 can include the vehicle 102 implementing the model component 104 (or another model) to receive the discretized representation 208 as input and apply a kernel or filter to output the blurred discretized representation 212. In some examples, the model component 104 can apply a Gaussian kernel to one or more of the discretized representations to cause blurring, though in other examples other kernels that cause different distributions can be applied. By way of example and not limitation, a kernel having a size of 31×31 (width, height), with a standard deviation of 15×15. The 31×31 kernel can process input image data having a size of 192×320 (width, height), though other kernel and/or input image data sizes are contemplated. In some examples, the model component 104 can apply a power value to the discretized representation 208 (e.g., multiplying the value of each pixel by the power value, raising the value of each pixel to the power of the power value, or the like), apply the kernel or filter, and then apply an inverse power value to output the blurred discretized representation 212 (e.g., division by the power value, raising the value of the pixel to the inverse of the power value, etc.). The power value can for example increase in intensity value of one or more pixels while the inverse power value can decrease the intensity value of the one or more pixels.

An operation 214 can include determining, based at least in part on the blurred occupancy prediction, a normalized occupancy prediction. For example, the operation 214 can include the model component 104 (or other model) comparing a value associated with a cell or pixel of the discretized representation 208 with a value associated with a cell or pixel of the blurred discretized representation 212 to output a normalized discretized representation 216. For example, an intensity value of a pixel associated with the discretized representation 208 can be divided by an intensity value of a pixel associated with the blurred discretized representation 212. In various examples, such a process may comprise ensuring that the sum of all likelihoods associated with a particular object sum to 1 (or other fixed constant). In some examples, the model component 104 can determine a local average intensity value for a pixel based at least in part on intensity values associated with neighboring pixels (e.g., pixels adjacent to a particular pixel). In such examples, the local average intensity values for multiple pixels can be compared one to another between multiple discretized representations.

In various examples, the normalized discretized representation 216 can generally be more diffuse or dilated relative to the discretized representation 208. As shown in FIG. 2, for example, the normalized discretized representation 216 can include a different size or shape (e.g., be larger than the discretized representation 208) to more accurately determine potential object occupancies at different times in the future.

An operation 218 can include controlling, based at least in part on the normalized discretized representation 216 operation of the vehicle. For example, the operation 218 can include a vehicle computing device receiving an output (e.g., output data 106) from the model component 104 and determining a candidate trajectory 220 for the vehicle to follow. In this way, the vehicle computing device can use the output to determine a level of caution for the vehicle 102 that is appropriate for the risk associated with a particular region of the environment 100.

In some examples, the operation 218 can include the vehicle computing device determining a level of caution (e.g., a caution flag and/or a sub-goal) along the candidate trajectory 220. In some examples, the vehicle computing device may control operation of the vehicle based at least in part on an output by the model to achieve different levels of acceleration, braking, and/or steering. For instance, outputs from the model can be used to associate with different acceleration, braking, and/or steering thresholds (e.g., sub-goals, levels of caution, etc.) for the vehicle in the vicinity of a region corresponding to the normalized discretized representation 216. For instance, a planning component of the vehicle computing device can apply one or more relaxed thresholds (e.g., harder braking, higher lateral acceleration, etc.) to avoid collision in the event that the vehicle 114 enters a path of the vehicle 102.

Figure 3A:
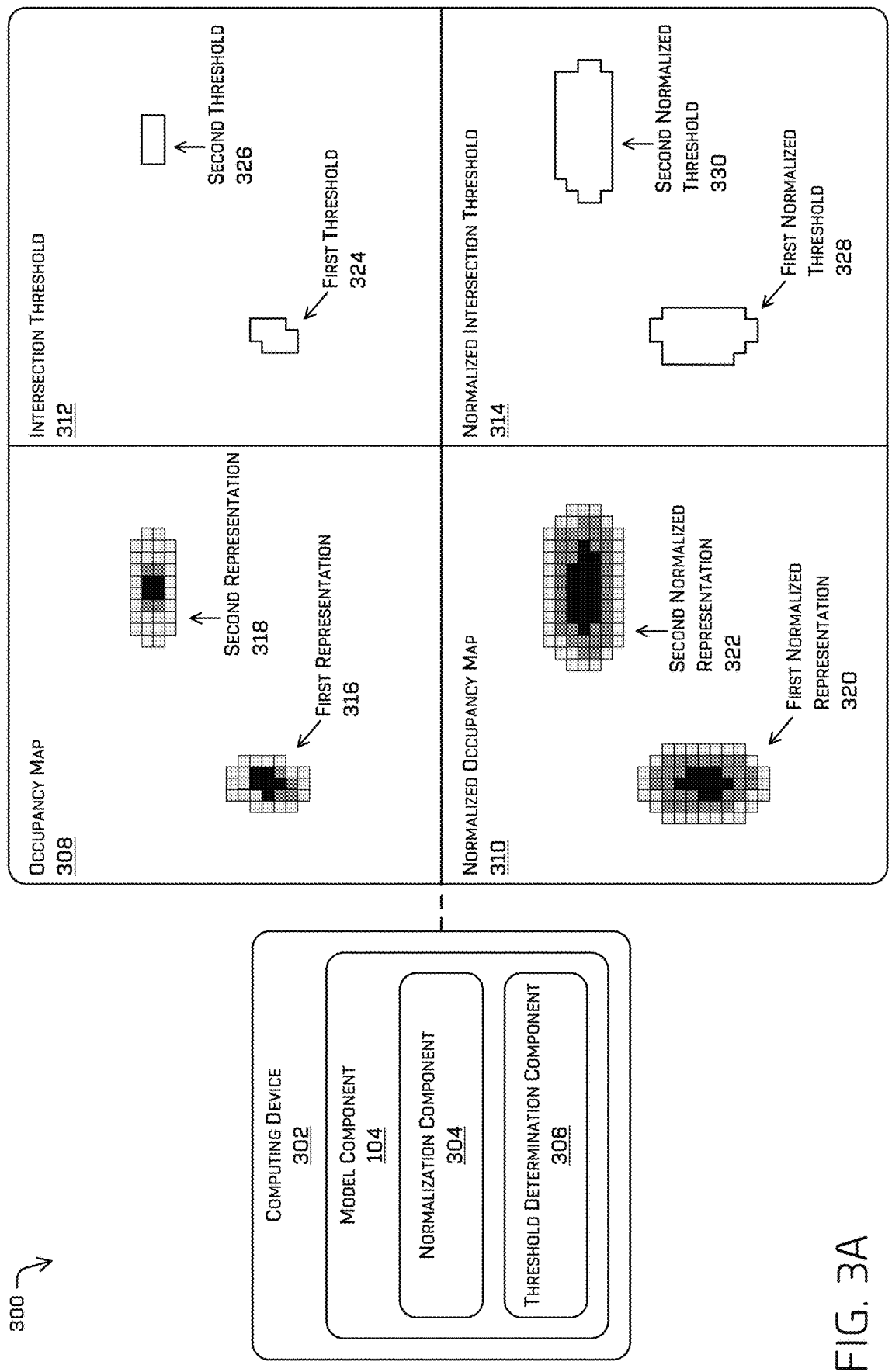
FIG. 3A is an illustration of an example computing device implementing a model to determine a normalized occupancy map and a normalized intersection threshold usable to control an example vehicle.

FIG. 3A is an illustration 300 of an example computing device implementing a model to determine a normalized occupancy map and a normalized intersection threshold usable to control an example vehicle. For instance, a computing device 302 can represent a vehicle computing device (e.g., vehicle computing device 404) and/or a vehicle safety system (e.g., vehicle safety system 434) that implements the model component 104 to control the vehicle 102. FIG. 3A shows the model component 104 including a normalization component 304 and a threshold determination component 306. Generally, the normalization component 304 can be configured to receive an occupancy map 308 as input data and determine output data representing a normalized occupancy map 310 (e.g., the same or similar to those processes described in at least FIG. 2, above). The threshold determination component 306 can be configured to adjust an intersection threshold 312 by outputting a normalized intersection threshold 314. The intersection threshold 312 and/or the normalized intersection threshold 314 can be used for identifying an overlap with a representation of the vehicle 102 when determining a potential intersection between an object and the vehicle 102.

In various examples, the normalization component 304 can receive a first representation 316 and a second representation 318 (e.g., the discretized representation 208) and output the normalized occupancy map 310 comprising a first normalized representation 320 and a second normalized representation 322. The normalized occupancy map 310 can include one or more normalized representations of regions in an environment of the vehicle 102 (e.g., the environment 100). The normalization component 304 can generate the first normalized representation 320 and/or the second normalized representation 322 using techniques similar to those described in FIG. 2 to determine the normalized discretized representation 216. For example, the normalization component 304 can apply a kernel, blur filter, an adaptive filter, or the like, to the first representation 316 and the second representation 318, respectively, and compare values of pixels associated with the first representation 316 and the second representation 318 to corresponding values of pixels in respective blurred representations. The first normalized representation 320 can, for example, be generated based at least in part on the comparison between respective intensity values of the first representation 316 and a blurred representation thereof.

The threshold determination component 306 can be configured to output the intersection threshold 312 comprising a first threshold 324 and a second threshold 326 as well as the normalized intersection threshold 314 comprising a first normalized threshold 328 and a second normalized threshold 330. The first threshold 324 and the second threshold 326 can represent pixels or cells of a corresponding representation (e.g., the first representation 316 and the second representation 318) that meet or exceed a value (e.g., above 99%). The first normalized threshold 328 and the second normalized threshold 330 can represent pixels or cells of a corresponding normalized representation (e.g., the first normalized representation 320 and the second normalized representation 322) that meet or exceed a value (e.g., above 99%).

In some examples, the model component 104 can determine whether pixels of the normalized occupancy map 310 overlap with pixels of a representation of the vehicle 102 (e.g., determine an overlap between an area of the normalized occupancy map and an area of the vehicle representation). In various examples, the model component 104 can identify pixels above the normalized intersection threshold 314 that overlap with the vehicle representation (e.g., a maximum occupancy prediction), and output an indication of a potential intersection with an object to another component of the vehicle computing device (e.g., a planning component configured to determine an action for the vehicle to take relative to the object).

As shown in FIG. 3A, the first normalized threshold 328 represents an area that is larger than the first threshold 324. Accordingly, a potential overlap with the vehicle representation is more likely thereby capturing more potential intersections between objects and the vehicle 102. In other words, an object that would otherwise not be detected by a safety system using the first threshold 324 can be identified and reacted to by the vehicle 102 using the first normalized threshold 328.

In some examples, the computing device 302 (e.g., a vehicle safety system) can implement the model component 104, or a different model, to initiate an example scenario comprising one or more normalized representations and the vehicle. In some examples, the scenario can include predictions about future regions that may be occupied by an object(s) in an environment proximate to the vehicle. For example, the output of the model component 104 can include predicting scenarios at times $T_0, T_1, \ldots, T_N$ (where N is an integer) indicative of future states of the environment. For example, sensor data associated with the vehicle 102 can be used to perform the scenarios to determine occupancy predictions for objects that may intersect with the vehicle 102 at different times in the future. In one specific example, the scenarios may be performed for 5 seconds in the future to identify potential object(s) in an area around the vehicle 102. Such outputs (e.g., at various times) may be output from a single model (e.g., with multiple outputs), from multiple models, multiple heads of a single model, etc.

Figure 3B:
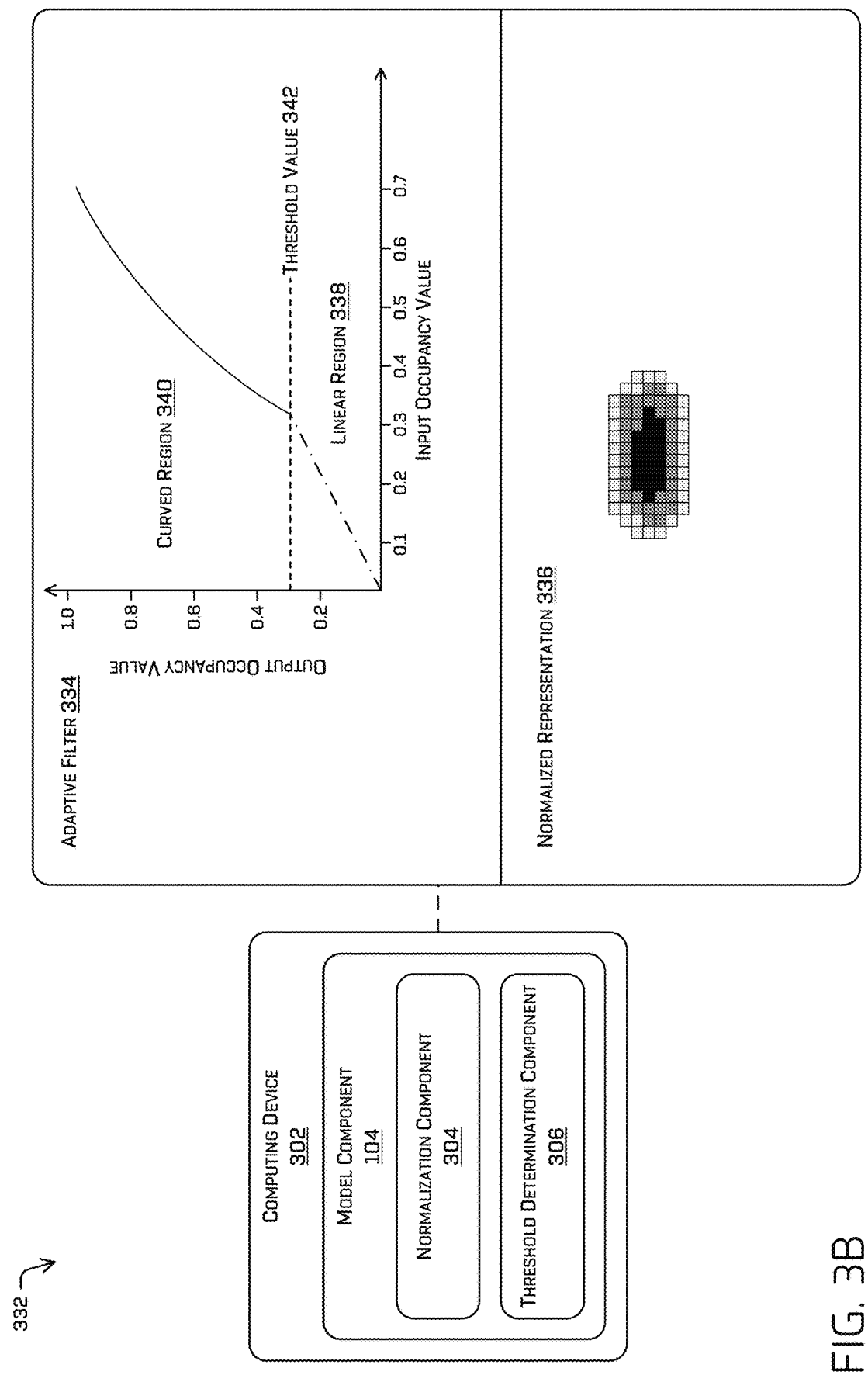
FIG. 3B is an illustration of an example computing device implementing a model to determine a normalized occupancy map based on an example adaptive filter.

FIG. 3B is an illustration 332 of an example computing device implementing a model to determine a normalized occupancy map based on an example adaptive filter. For instance, the computing device 302 can include the model component 104 to control the vehicle 102 based at least in part on determining one or more normalized occupancy maps using an adaptive filter 334. FIG. 3B shows the model component 104 including the normalization component 304 and the threshold determination component 306.

In some examples, the normalization component 304 can be configured to receive an occupancy map 308 as input data and determine output data representing a normalized occupancy map 336 based at least in part on the adaptive filter 334. Generally, the adaptive filter 334 represents two or more filtering techniques such as applying a first function to a portion of the input image data to produce a linear output, applying a second function to a same or different portion of the input image data to produce a curved output, etc. In some examples, the first function and the second function can represent different filters (e.g., a linear filter, a logarithmic filter, etc.) usable to generate output values that represent a blurred occupancy prediction or a normalized occupancy prediction. In various examples, the adaptive filter 334 can be employed to generate the blurred occupancy prediction (or blurred occupancy map), and values associated with pixels of the blurred occupancy prediction can then be used to determine the normalized occupancy prediction (or normalized occupancy map).

As shown in FIG. 3B, the adaptive filter can plot an input occupancy value associated with of an occupancy map relative to output occupancy values associated with a blurred occupancy map. The adaptive filter 334 can include a linear region 338 to represent a region in which the model component 104 applies a linear filtering technique to pixels in the occupancy map. The adaptive filter 334 can also include a curved region 340 to represent a region in which the model component 104 applies a curved filtering technique to pixels in the occupancy map.

In some examples, the threshold determination component 306 can be configured to determine a threshold value 342 usable to define the linear region 338 (an area below the threshold value 342) and a curved region 340 (an area at or above the threshold value 342). In various examples, the normalization component 304 can apply the linear filtering technique to pixel(s) in the occupancy map that are associated with the linear region 338 and/or a curved filtering technique to pixel(s) in the occupancy map that are associated with the curved region 340. The linear filtering technique and/or the curved filtering technique can represent a function or algorithm that, when applied to values of input data (image data such as an occupancy map or occupancy prediction), increases contrast in a pixel value. In some examples, the function or algorithm can increase the pixel value based at least in part on a) averaging pixel values in a neighborhood of the pixel (one or more adjacent pixels) and/or b) determining a maximum pixel value in the neighborhood of the pixel (within a range of pixels adjacent to the pixel). In some examples, the function shape of the curved region 340 can be based on a pixel value within a portion of the input data (e.g., the shape of the curve 340 can be based on a value within a kernel).

In some examples, the threshold determination component 306 can determine the threshold value 342 over time using a machine learned model or other techniques to ensure that the pixels are processed according to the learned filtering technique and/or the curved filtering technique in an efficient way.

In some examples, the normalization component 304 can apply a gain (an increase in value) to the occupancy map (or pixels thereof) before or after applying one of the two or more filtering techniques. For example, the pixels values may be multiplied by a predetermined value to cause the values to increase before a logarithmic filter is applied to some of the pixels of the occupancy map (those in the curved region 340). A slope associated with a curve in the curved region can be used to determine an amount to amplify, distort, or otherwise modify a pixel value. In examples when the logarithmic filter is used, the adaptive filter 334 can amplify the contrast of a pixel value while maintaining a maximum value of 1. In some examples, the slope or shape of the curve can be determined with consideration to maximum pixel values in a neighborhood of pixels.

In some examples, a potential intersection with the vehicle can be communicated to another model or component of a vehicle computing device for validating commands determined by the vehicle computing device. In some examples, and as discussed in FIG. 4 and elsewhere, a vehicle computing device can use the occupancy prediction data to improve detections of objects proximate a vehicle (whether based on a blur filter, an adaptive filter, etc.). In one example, the vehicle computing device can cause the vehicle 102 to accelerate, brake, and/or steer to avoid an object approaching the vehicle.

Figure 4:
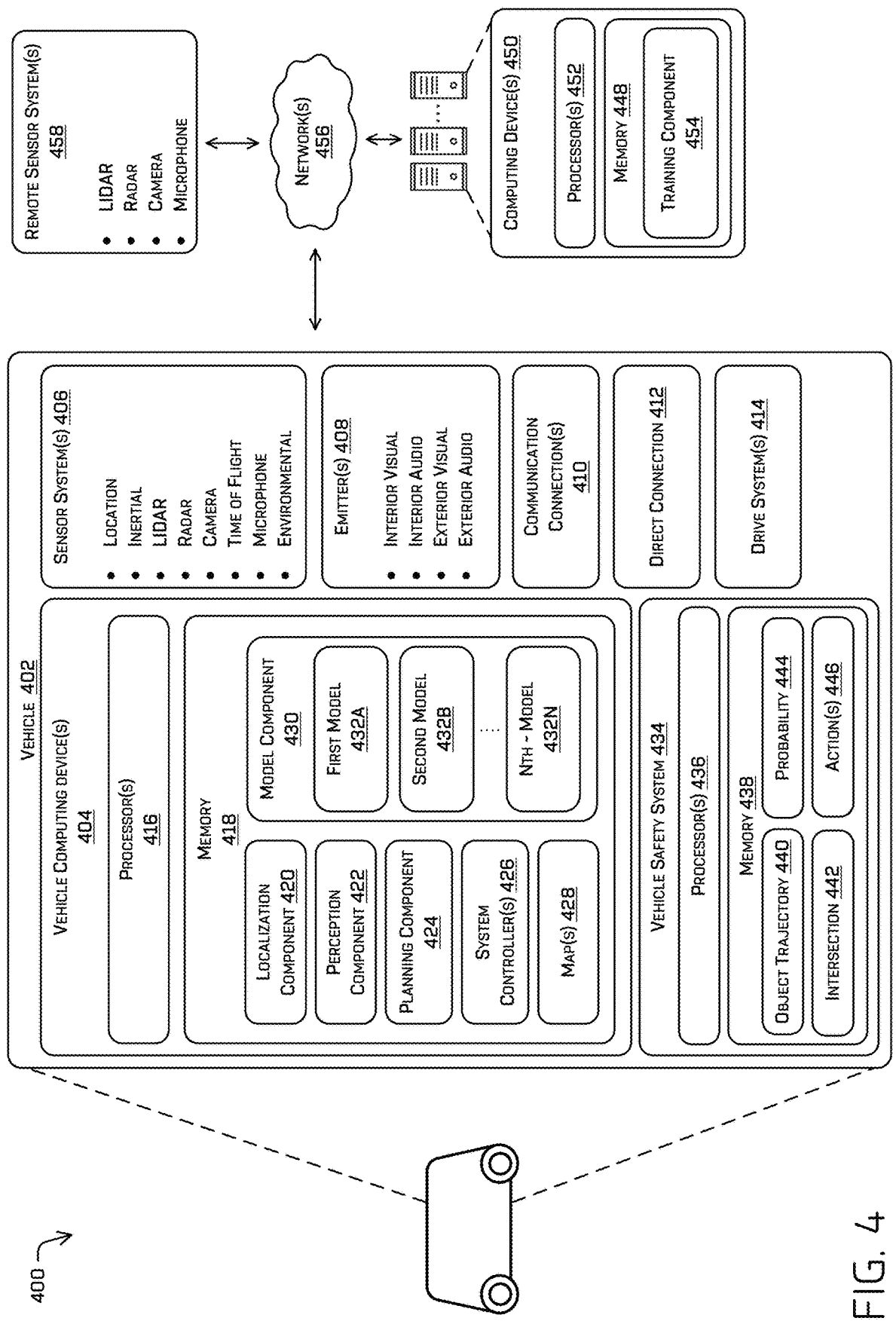
FIG. 4 is a block diagram of an example system for implementing the techniques described herein.

FIG. 4 is a block diagram of an example system 400 for implementing the techniques described herein. In at least one example, the system 400 may include a vehicle, such as vehicle 402.

The vehicle 402 may include a vehicle computing device 404 (also referred to as a vehicle computing device 404 or vehicle computing device(s) 404), one or more sensor systems 406, one or more emitters 408, one or more communication connections 410, at least one direct connection 412, and one or more drive systems 414.

The vehicle computing device(s) 404 may include one or more processors 416 and memory 418 communicatively coupled with the one or more processors 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In the illustrated example, the memory 418 of the vehicle computing device 404 stores a localization component 420, a perception component 422, a planning component 424, one or more system controllers 426, one or more maps 428, and a model component 430 including one or more models, such as a first model 432A, a second model 432B, up to an Nth model 432N (collectively "models 432"), where N can be any integer greater than 1. Though depicted in FIG. 4 as residing in the memory 418 for illustrative purposes, it is contemplated that the localization component 420, the perception component 422, the planning component 424, the one or more system controllers 426, the one or more maps 428, and/or the model component 430 including the models 432 may additionally, or alternatively, be accessible to the vehicle 402 (e.g., stored on, or otherwise accessible by, memory remote from the vehicle 402, such as, for example, on memory 448 of a remote computing device 450).

Additionally, vehicle 402 may include a vehicle safety system 434, including an object trajectory component 440, an intersection component 442, a probability component 444, and an action component 446. As shown in this example, the vehicle safety system 434 may be implemented separately from the vehicle computing device(s) 404, for example, for improved performance of the vehicle safety system, and/or to provide redundancy, error checking, and/or validation of determinations and/or commands determined by the vehicle computing device(s) 404. However, in other examples, the vehicle safety system 434 may be implemented as one or more components within the same vehicle computing device(s) 404.

By way of example, the vehicle computing device(s) 404 may be considered to be a primary system, while the vehicle safety system 434 may be considered to be a secondary system. The primary system may generally perform processing to control how the vehicle maneuvers within an environment. The primary system may implement various artificial intelligence (AI) techniques, such as machine learning, to understand an environment around the vehicle 402 and/or instruct the vehicle 402 to move within the environment. For example, the primary system may implement the AI techniques to localize the vehicle, detect objects around the vehicle, segment sensor data, determine classifications of the objects, predict object tracks, generate trajectories for the vehicle 402 and the objects around the vehicle, and so on. In some examples, the primary system may process data from multiple types of sensors on the vehicle, such as light detection and ranging (lidar) sensors, radar sensors, image sensors, depth sensors (time of flight, structured light, etc.), cameras, and the like, within the sensor systems 406.

In some examples, the vehicle safety system 434 may operate as separate system that receives state data (e.g., perception data) based on the sensor data and AI techniques implemented by the primary system (e.g., vehicle computing device(s) 404), and may perform various techniques described herein for improving collision prediction and avoidance by the vehicle 402. As described herein, the vehicle safety system 434 may implement techniques for predicting intersections/collisions based on sensor data, as well as probabilistic techniques that are based on positioning, velocity, acceleration, etc. of the vehicle and/or objects around the vehicle. In some examples, the vehicle safety system 434 may process data from sensors, such as a subset of sensor data that is processed by the primary system. To illustrate, the primary system may process lidar data, radar data, image data, depth data, etc., while the vehicle safety system 434 may process just lidar data and/or radar data (and/or time of flight data). In other examples, however, the vehicle safety system 434 may process sensor data from any number of sensors, such as data from each of the sensors, data from the same number of sensors as the primary system, etc.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference in its entirety and for all purposes.

Although depicted in FIG. 4 as residing in the memory 418 for illustrative purposes, it is contemplated that the localization component 420, the perception component 422, the planning component 424, the model component 430, the system controllers 426, and the maps 428 may additionally, or alternatively, be accessible to the vehicle 402 (e.g., stored on, or otherwise accessible by, memory remote from the vehicle 402, such as, for example, on memory 448 of a remote computing device 450). Similarly, the object trajectory component 440, intersection component 442, probability component 444, and/or action component 446 are depicted as residing in the memory 438 of the vehicle safety system 434, one or more of these components may additionally, or alternatively, be implemented within vehicle computing device(s) 404 or may be accessible to the vehicle 402 (e.g., stored on, or otherwise accessible by, memory remote from the vehicle 402, such as, for example, on memory 448 of a remote computing device 450).

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 428 and/or map component 428, and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 420 may provide data to various components of the vehicle 402 to determine an initial position of an autonomous vehicle for determining the relevance of an object to the vehicle 402, as discussed herein.

In some instances, the perception component 422 may include functionality to perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 424 may determine a path for the vehicle 402 to follow to traverse through an environment. For example, the planning component 424 may determine various routes and trajectories and various levels of detail. For example, the planning component 424 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 424 may generate an instruction for guiding the autonomous vehicle along at least a portion of the route from the first location to the second location. In at least one example, the planning component 424 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 402 to navigate.

In some examples, the planning component 424 may include a prediction component to generate predicted trajectories of objects (e.g., dynamic objects such as pedestrians, cars, trucks, bicyclists, animals, etc.) in an environment. For example, a prediction component may generate one or more predicted trajectories for objects within a threshold distance from the vehicle 402. In some examples, a prediction component may measure a trace of an object and generate a trajectory for the object based on observed and predicted behavior.

In at least one example, the vehicle computing device 404 may include one or more system controllers 426, which may be configured to control steering, propulsion, braking, safety, emitters, communication, and other systems of the vehicle 402. The system controller(s) 426 may communicate with and/or control corresponding systems of the drive system(s) 414 and/or other components of the vehicle 402.

The memory 418 may further include one or more maps 428 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 428. That is, the map(s) 428 may be used in connection with the localization component 420, the perception component 422, and/or the planning component 424 to determine a location of the vehicle 402, detect or determine gravity, detect objects in an environment, generate routes, determine actions and/or trajectories to navigate within an environment.

In some examples, the one or more maps 428 may be stored on a remote computing device(s) (such as the computing device(s) 450) accessible via network(s) 456. In some examples, multiple maps 428 may be stored based on, for example, a characteristic (e.g., type of entity, time of day, day of week, season of the year, etc.). Storing multiple maps 428 may have similar memory requirements, but increase the speed at which data in a map may be accessed.

As illustrated in FIG. 4, the vehicle computing device 404 may include a model component 430. The model component 430) may be configured to determine probabilities for an intersection between an object in an environment of the vehicle 402. For instance, the model component 430 can determine an occupancy prediction such as the discretized representation 208, the normalized occupancy map 310, and/or the normalized intersection threshold 314, etc. In various examples, the model component 430) may receive sensor data associated with an object from the localization component 420), the perception component 422, and/or from the sensor system(s) 406. In some examples, the model component 430) may receive map data from the localization component 420, the perception component 422, the maps 428, and/or the sensor system(s) 406. While shown separately in FIG. 4, the model component 430) could be part of the localization component 420, the perception component 422, the planning component 424, or other component(s) of the vehicle 402.

In various examples, the model component 430 may send output(s) from the first model 432A, the second model 432B, and/or the Nth model 432N may be used by the perception component 422 to alter or modify an amount of perception performed in an area of the object based on an associated intersection value. In some examples, the planning component 424 may determine one or more actions (e.g., reference actions and/or sub-actions) for the vehicle 402 based at least in part on output(s) from the model component 430. In some examples, the model component 430) may be configured to output information indicating a probability that an object is likely to cause a collision. In some examples, the model component 430 may include at least the functionality provided by the model component 104 of FIG. 1.

In some examples, the model component 430 may communicate an output to the perception component 422 to cause an update to one or more parameters (e.g., bias values, drift values, and the like) associated with the sensor system(s) 406.

In various examples, the model component 430 may utilize machine learning techniques to determine an intersection probability, as described with respect to FIG. 1 and elsewhere. In such examples, machine learning algorithms may be trained to predict a probability of an intersection while improving accuracy of the prediction.

The vehicle safety system 434 may include an object trajectory component 440) configured to determine a trajectory for the vehicle 402 and/or trajectories for other objects identifying within an environment, using the various systems and techniques described herein. In some examples, the object trajectory component 440 may receive planning data, perception data, and/or map data from the components 420-426 to determine a planned trajectory for the vehicle 402 and trajectories for the other objects in the environment.

In various examples, the object trajectory component 440 may generate a set of single points and/or pairs of related points (e.g., for a path polygon) representing a trajectory. In some examples the pairs of points and/or single points for a single trajectory may be at consistent intervals (e.g., 0.2 second intervals, 0.5 second intervals, etc.) from one another. In some examples, the pairs of points and/or single points may be at varying intervals from one another. In various examples, the pairs of points and/or single points may be represented at equal distances in length (e.g., length along the path) from one another. In such examples, each left/right point of a point pair may be at a pre-defined distance (e.g., 1 meter, 3 feet, 18 inches, etc.) from the next left/right point of the point pair. In some examples, the pairs of points may be at different distances in length from one another. In various examples, the distances may be determined based on a vehicle/object maneuvers, speeds, density of traffic in the environment, and/or other factors impacting the vehicle 402 or object for which the trajectory is determined.

In some examples, the object trajectory component 440 determine a single planned trajectory for the vehicle 402 (e.g., based on planning data and map data received from the planning component 424 and maps 428, and may determine multiple trajectories for one or more other moving objects (e.g., vehicle 110) in the environment in which the vehicle 402 is operating. In some examples, the trajectories of another object may include any number of possible paths in which the object may travel from a current position (e.g., at the time of perception) and/or based on a direction of travel. Based on the determination that the agent is within the threshold distance or time to the vehicle 402, the object trajectory component 440 may determine the trajectories associated with the object. In some examples, the object trajectory component 440 may be configured to determine the possible trajectories of each detected moving object in the environment.

In various examples, the intersection component 442 may use the various techniques described herein to determine intersections between the trajectory of the vehicle 402 (or representation thereof) and/or one or more of the trajectories for other objects in the environment (or object representation (s)), to determine whether a potential collision zone may exist in the environment. A potential collision zone may include an area in which, based on the object state data, vehicle state data, and/or the trajectories, an intersection may occur between the vehicle 402 and an object (e.g., vehicle 110). In at least some examples, a trajectory for the object and object attributes (e.g., object size, position, orientation, pose, etc.) may be used to calculate an intersection point between the object and the vehicle. In such examples, a collision zone may be defined by the overlapping area between a portion of the vehicle 402 and at least a portion of the object (or representations thereof). In some examples, the intersection component 442 can determine values for pixel(s) in the overlapping area and/or determine a maximum pixel value in the overlapping area. In some examples, the intersection component 442 can compare the maximum pixel value (e.g., maximum intensity value) to an intersection threshold configured to represent a potential intersection, and output an indication of the potential intersection based at least in part on the comparing. In various examples, intersections between trajectories or representations can be based at least in part on an overlap of any portion of corresponding trajectories or corresponding representations (independent of values associated with pixel(s)).

In some examples, the potential collision zone may exist between the vehicle 402 and the object if the trajectory associated with the vehicle 402 intersects with at least one trajectory associated with the object. In various examples, the intersection component 442 may determine that the potential collision zone may exist between the vehicle 402 and the object based on the vehicle and object trajectories being within a threshold distance (e.g., 2 feet, 3 feet, 4 meters, 5 meters, etc.). In some examples, the threshold distance may be based on a pre-defined distance. In various examples, the threshold distance may be determined based on a known or perceived width of the vehicle and/or of the object. In some examples, the threshold distance may be determined further a buffer, which may represent a safety buffer around the vehicle 402 and/or the object.

In some examples, the intersection component 442 may expand the edges of the vehicle trajectory and/or trajectories for the object, from the center of the vehicle 402 and/or the object respectively, based on the known or perceived width of the vehicle and object. If the expanded width of the vehicle trajectory (or path polygon) and object trajectory (or path polygon) intersects and/or pass within a minimum allowable distance (e.g., 3 inches, 5 inches, 1 feet), the intersection component 442 may determine that the potential collision zone exists. If the expanded width of the vehicle trajectories and/or path polygons do not intersect and/or pass by more than the minimum allowable distance, the intersection component 442 may determine that the collision zone does not exist. The minimum allowable distance may be based on whether passengers are in the vehicle, a width of the roads in the environment, passenger comfort and/or reaction, learned tolerances of passengers, local driving etiquette, or the like.

In various examples, based on a determination that a potential collision zone may exist, the intersection component 442 may be configured to determine the bounds of the potential collision zone. In some examples, the potential collision zone may include four elements, a vehicle enter point, a vehicle exit point, an object enter point, and an object exit point. Each of the vehicle 402 and object enter and exit points may include a position and distance. The object entry point and object exit point may include trajectory samples, such as trajectory samples, along the trajectory of the object. In some examples, object entry point and agent exit point may represent trajectory samples in which a risk of collision does not exist. In various examples, an object enter point position may be determined by identifying the last trajectory sample associated with the trajectory of the object prior to an intersection (e.g., convergence) with the trajectory or path polygon for the vehicle 402. In some examples, an object exit point position may be determined by identifying the first trajectory sample associated with the object trajectory after the convergence between the trajectory of the object and the trajectory or path polygon of the vehicle 402. The distance associated with object enter point and the object exit point may be derived from the respective positions as a distance along the trajectory.

As discussed above, in various examples the intersection component 442 may perform time-space overlap analysis on one or more potential collision zones (bounds thereof, such as the vehicle and object enter and exit points). In various examples, the time-space overlap may be represented as position cones associated with predicted object trajectories and the planned trajectory of the vehicle 402. In various examples, the intersection component 442 may be configured to determine a vehicle position cone and an agent position cone. The vehicle position cone may be determined based on probable velocities of the vehicle 402 along the planned trajectory (e.g., path polygon) through the potential collision zone. The object position cone may be determined based on probable velocities of the agent along the trajectory for the object associated with the potential collision zone.

In various examples, intersection component 442 may determine position lines and/or position cones for the object and the vehicle 402 respective to the potential collision zone. The position lines and/or cones for the vehicle 402 and the object may be based on the object entry time, object exit time, vehicle entry time, and vehicle exit time with respect to the potential collision zone. In such examples, the entry times into the potential collision zone may be associated with a most aggressive estimation of speed. In various examples, the object exit time and the vehicle exit time may be associated with respective minimum velocities. In such examples, the exit times into the potential collision zone may be associated with a most conservative estimation of speed.

In some examples, the time-space overlap may be represented as one or more probability density functions associated with probable positions of the object based on time. The probable positions of the object may be derived from probable accelerations, and speeds derived therefrom and/or outputs of other systems or subsystems (e.g., a prediction system, which may be, for example, a subsystem of the perception component 422). The probability density functions may represent aggressive and conservative driving speeds, as well as uncertainties based on accelerations of the object, such as those based on traffic laws, rules of the road, local driving etiquette, traffic patterns, semantic classification of the agent, or the like. The probability density functions may represent two-dimensional area or three-dimensional areas associated with the object. The total sum of the area under a curve of a probability density function may equal 1.

In various examples, probability component 444 may determine a prediction of an intersection between the vehicle 402 and/or the other object (e.g., vehicle 110) and/or a probability/risk of collision, based on the time-space overlap analyses performed by the intersection component 442. In some examples, the probability component 444 may determine a probability of an intersection based on a single trajectory of the vehicle 402 and a single trajectory of the object, based on an overlap between position lines and/or position cones of the vehicle 402 and object with respect to the potential collision zone. For instance, based on where in the potential collision zone that the position lines overlap, and/or the amount of overlap between the position cones (e.g., the time gap, percentage of cone overlap, etc.), the probability component 444 may determine a risk of collision. In some examples, the probability component 444 can predict an intersection by propagating a vehicle representation and a representation of a region or object forward in time. For instance, the vehicle representation 120 and the first discretized representation 108 (e.g., a blurred occupancy prediction and/or a normalized occupancy prediction) can be determined for different times in the future, and the probability component 444 can determine an occurrence of an overlap and/or determine that a sum of pixels values (or average, etc.) in an overlap region is above a threshold value.

Additionally, using the various techniques described herein, the probability component 444 also may determine a probability of an intersection between the vehicle 402 and an object, based on the planned trajectory of the vehicle 402 and multiple trajectories of the object. For example, the intersection component 442 may analyze multiple trajectories of the object (e.g., based on perturbations of the object state parameters), and the probability component 444 may determine a single collision prediction based on the results of the analyses the multiple trajectories. In some cases, the probability component 444 may determine an intersection probability based on the percentage (or ratio) of trajectories for the object that are determined to intersect or collide with the vehicle 402 based on the planned vehicle trajectory.

In various examples, the action component 446 may determine one or more actions for the vehicle 402 to take, based on predictions and/or probability determinations of an intersection between the vehicle 402 another object (e.g., vehicle 102), along with other factors. The action may include slowing the vehicle to yield to the object, stopping the vehicle to yield to the object, changing lanes or swerving left, or changing or swerving lanes right, etc. Based on the determined action, the vehicle computing device(s) 404, such as through the system controller(s) 426, may cause the vehicle 402 to perform the action. In at least some examples, such an action may be based on the probability of collision, determined by the probability component 444 based on multiple trajectories for the object, as described in detail. In various examples, responsive to determining to adjust a lateral position of the vehicle, such as in a lane change to the left or to the right, the vehicle safety system 434 may cause the components 440-446 to generate an updated vehicle trajectory, plot additional object trajectories with respect to the updated vehicle trajectory, determine updated potential collision zones, and perform time-space overlap analyses to determine whether an intersection risk may still exist after the determined action is performed by the vehicle 402.

The action component 446 may determine, in some examples, one or more actions for the vehicle 402 to take, based on receiving a signal form the model component 430. For instance, the model component 430 can determine an intersection probability between the vehicle 402 and one or more objects and generate a signal for sending to the action component 446 after applying a blur filter. In some examples, the model component 430 can determine normalized occupancy predictions (e.g., the normalized occupancy map 310) associated with object(s) that may impact operation of the vehicle 402 (e.g., cause an intersection, affect passenger comfort, impact vehicle safety, etc.)

As can be understood, the components discussed herein (e.g., the localization component 420, the perception component 422, the planning component 424, the one or more system controllers 426, the one or more maps 428, and the vehicle safety system 434 including the object trajectory component 440, the intersection component 442, the probability component 444, and the action component 446 are described as divided for illustrative purposes. However, the operations performed by the various components may be combined or performed in any other component.

In some instances, aspects of some or all of the components discussed herein may include any models, techniques, and/or machine learned techniques. For example, in some instances, the components in the memory 418 (and the memory 448, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device 404. Additionally, or in the alternative, the sensor system(s) 406 may send sensor data, via the one or more networks 456, to the one or more computing device(s) 450 at a particular frequency, after a lapse of a predetermined period of time, in near real-time, etc. In some examples, the model component 430 may receive sensor data from one or more of the sensor system(s) 406.

The vehicle 402 may also include one or more emitters 408 for emitting light and/or sound. The emitters 408 may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connections 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., remote computing device 450, other nearby vehicles, etc.) and/or one or more remote sensor system(s) 458 for receiving sensor data. The communication connection(s) 410 also enable the vehicle 402 to communicate with a remote teleoperations computing device or other remote services.

The communication connection(s) 410 may include physical and/or logical interfaces for connecting the vehicle computing device 404 to another computing device or a network, such as network(s) 456. For example, the communication connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive system controller which may receive and preprocess data from the sensor system(s) and to control operation of the various vehicle systems. In some examples, the drive system controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive system with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the planning component 424, the one or more system controllers 426, the one or more maps 428, and the model component 430, may process sensor data, as described above, and may send their respective outputs, over the one or more network(s) 456, to the computing device(s) 450. In at least one example, the localization component 420, the perception component 422, the planning component 424, the one or more system controllers 426, the one or more maps 428, and the model component 430 may send their respective outputs to the computing device(s) 450 at a particular frequency, after a lapse of a predetermined period of time, in near real-time, etc.

In some examples, the vehicle 402 may send sensor data to the computing device(s) 450 via the network(s) 456. In some examples, the vehicle 402 may receive sensor data from the computing device(s) 450 and/or remote sensor system(s) 458 via the network(s) 456. The sensor data may include raw sensor data and/or processed sensor data and/or representations of sensor data. In some examples, the sensor data (raw or processed) may be sent and/or received as one or more log files.

The computing device(s) 450 may include processor(s) 452 and a memory 448 storing a training component 454.

In some instances, the training component 454 can include functionality to train a machine learning model to output classification values. For example, the training component 454 can receive data that represents labelled collision data (e.g., publicly available data, sensor data, and/or a combination thereof). At least a portion of the data can be used as an input to train the machine learning model. As a non-limiting example, sensor data, audio data, image data, map data, inertia data, vehicle state data, historical data (log data), or a combination thereof may be input into the machine learned model. Thus, by providing data where the vehicle traverses an environment, the training component 454 can be trained to output intersection values associated with objects during simulation (e.g., occupancy predictions), as discussed herein.

In some examples, the training component 454 may be implemented to train the model component 430. Training data may include a wide variety of data, such as image data, video data, lidar data, radar data, audio data, other sensor data, etc., that is associated with a value (e.g., a desired classification, inference, prediction, etc.). Such data and associated values may generally be referred to as a "ground truth." In such examples, the training component 454 may determine a difference between the ground truth (e.g., training data) and output(s) by the model component 454. Based at least in part on the difference(s), training by the training component 454 may include altering a parameter of the machine-learned model to minimize the difference(s) to obtain a trained machine-learned model that is configured to determine potential intersection(s) between object(s) in the environment and the vehicle 402.

In various examples, during training, the model component 430 may adjust weights, filters, connections between layers, and/or parameters for training the individual untrained neural networks to predict potential intersection(s) (or other tasks), as discussed herein. In some instances, the model component 430 may use supervised or unsupervised training.

In some examples, the training component 454 can include training data that has been generated by a simulator. For example, simulated training data can represent examples where a vehicle collides with an object in an environment or nearly collides with an object in an environment, to provide additional training examples.

In some examples, functionality provided by the training component 454 may be included and/or performed by the vehicle computing device 404.

The processor(s) 416 of the vehicle 402, processor(s) 436 of the vehicle safety system 434, and/or the processor(s) 452 of the computing device(s) 450 may be any suitable processor capable of executing instructions to process data and perform operations as described herein. By way of example and not limitation, the processor(s) 416, 436, and 452 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418, memory 438, and memory 448 are examples of non-transitory computer-readable media. The memory 418, the memory 438, and/or memory 448 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 418, the memory 438, and memory 448 may include at least a working memory and a storage memory. For example, the working memory may be a high-speed memory of limited capacity (e.g., cache memory) that is used for storing data to be operated on by the processor(s) 416, 436, and/or 452. In some instances, the memory 418, the memory 438, and memory 448 may include a storage memory that may be a lower-speed memory of relatively large capacity that is used for long-term storage of data. In some cases, the processor(s) 416, 436, and/or 452 cannot operate directly on data that is stored in the storage memory, and data may need to be loaded into a working memory for performing operations based on the data, as discussed herein.

It should be noted that while FIG. 4 is illustrated as a distributed system, in alternative examples, components of the vehicle 402 may be associated with the computing device(s) 450 and/or components of the computing device(s) 450 may be associated with the vehicle 402. That is, the vehicle 402 may perform one or more of the functions associated with the computing device(s) 450, and vice versa. For instance, either the vehicle 402 and/or the computing device(s) 450 may perform training operations relating to one or more of the models described herein.

Figure 5:
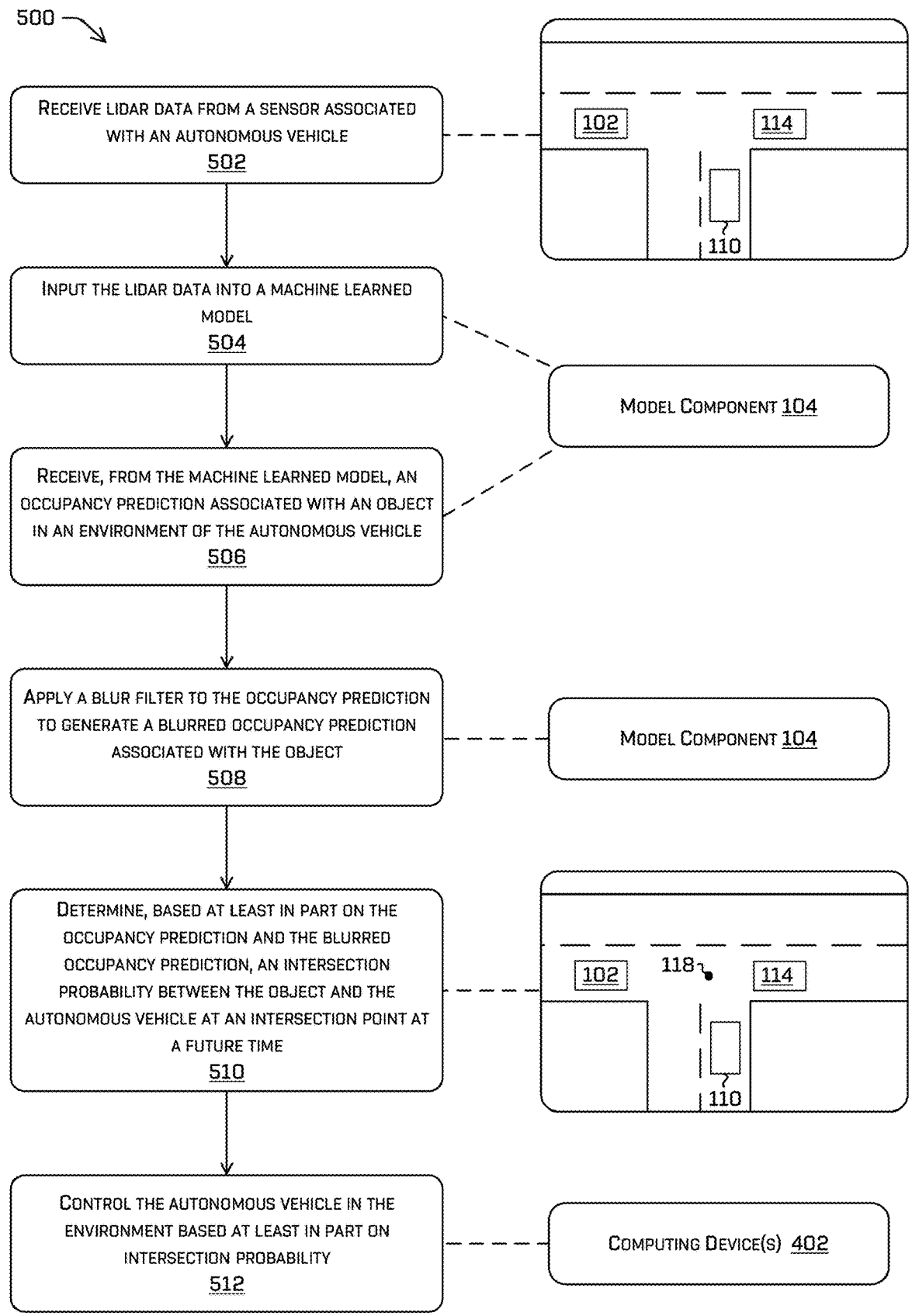
FIG. 5 is a flowchart depicting an example process for determining an intersection probability between the object and an autonomous vehicle using one or more example models.

FIG. 5 is a flowchart depicting an example process 500 for determining an intersection probability between the object and an autonomous vehicle using one or more example models. For example, some or all of the process 500 can be performed by one or more components in FIG. 4, as described herein. For example, some or all of the process 500 can be performed by the vehicle computing device(s) 404 and/or the vehicle safety system 434.

At operation 502, the process may include receiving lidar data from a sensor associated with an autonomous vehicle. In some examples, the operation 502 may include a vehicle computing device capturing sensor data from a lidar sensor, a radar sensor, and so on, of the vehicle 402. In some examples, the sensor data can be processed to determine top-down multi-channel data of the environment. The sensor data may be received from one or more sensors on the vehicle and/or from one or more remote sensors remote from the vehicle.

At operation 504, the process may include inputting the lidar data into a machine learned model. In some examples, the operation 504 may include a vehicle computing device implementing the model component 104 that is configured to predict, infer, estimate, generate, or otherwise determine one or more occupancy predictions. In some examples, an intersection probability can be determined based at least in part on the one or more occupancy predictions. In various examples, the lidar data can be "pre-processed" for use as input data to generate two-dimensional representations to achieve a desired input data size for more efficient processing. In so the two-dimensional data representation may include a vector representation. In various examples, the machine learned model (or other model) can receive input data based at least in part on down sampling and/or up sampling portions of the lidar data to achieve a desired resolution or data size for the input data. While describes in the context of lidar data, other input data may also or instead be input into the machine learned model such as image data, radar data, data point information (e.g., a distance from the vehicle, an azimuth angle relative to the vehicle, intensity, coordinate values, velocity, and so on), vehicle information (e.g., a planned trajectory of the vehicle, position, orientation, steering wheel angle, and so on), object information (e.g., a predicted velocity, trajectory, position, orientation, and so on), environmental information (e.g., weather conditions, elevation, and the like), parameter information (e.g., one or more parameters associated with an algorithm to be implemented by the model), map data, etc.

At operation 506, the process may include receiving, from the machine learned model, an occupancy prediction associated with an object in an environment of the autonomous vehicle. In some examples, the operation 506 may include determining an occupancy grid (e.g., the first discretized representation 108, the occupancy map 308) comprising a plurality of grid points (or cells such as the cell 124) representing a probability of occupancy of pixels in the environment, and predicting an occupancy of a region associated with one or more objects based on the occupancy grid. For instance, the top-down multi-channel data can be processed by the vehicle computing device to determine whether an object in the environment is associated with one of the grid points (or cells) of the occupancy grid.

At operation 508, the process may include applying a blur filter to the occupancy prediction to generate a blurred occupancy prediction associated with the object. In some examples, the operation 508 may include the model component 104 applying a Gaussian blur algorithm, a uniform blur algorithm, an averaging operation, or other blur algorithm to the discretized representation 208 to determine the blurred discretized representation 212. In various examples, the model component 104 can identify an intensity (or other metric) of pixels associated with the occupancy prediction output by the model component 104 and increase and/or decrease a value associated with one or more pixels (e.g., by scaling them by a factor, raising them to a power, or the like) prior to and/or after applying the blur filter. For instance, the model component 104 can apply a power value to the discretized representation 208, apply the blur filter, and then apply an inverse power value to output the blurred discretized representation 212. The power value can, for example, increase in intensity value of one or more pixels while the inverse power value can decrease the intensity value of the one or more pixels. In some examples, the blur filter can represent a multi-dimensional discrete convolution applied over the occupancy prediction, e.g., with a Gaussian blur or otherwise.

At operation 510, the process may include determining, based at least in part on the occupancy prediction and the blurred occupancy prediction, an intersection probability between the object and the autonomous vehicle at an intersection point at a future time. In some examples, the operation 510 may include the model component 104 (and/or another statistical model) determining the intersection probability associated with the intersection region 118 based at least in part on a comparison between the occupancy prediction and the blurred occupancy prediction. For instance, the model can divide an intensity value of a pixel associated with the discretized representation 208 by an intensity value of a pixel associated with the blurred discretized representation 212 to generate or otherwise determine a normalized occupancy map (e.g., the normalized occupancy map 310). In some examples, the model can compare values of pixels to a pixel threshold to further process pixel values that are at or above the pixel threshold in operations.

At operation 512, the process may include controlling the autonomous vehicle in the environment based at least in part on intersection probability. In some examples, the operation 512 may include the vehicle safety system employed by the vehicle computing device sending one or more outputs to a vehicle computing device (e.g., the vehicle computing device(s) 404) to cause at least one of a braking action to cause the vehicle to brake, a steering action to cause the vehicle to steer, or an acceleration action to cause the vehicle to accelerate. In this way, the vehicle safety system can cause the vehicle computing device to avoid an object associated with the occupancy prediction.

In various examples, process 500 may return to 502 after performing operation 512. In such examples, the vehicle may continuously monitor for potential collisions and update/modify decisions regarding whether to engage a safety system or not (which may, in at least some examples, include performing one or more maneuvers to mitigate or minimize an impact). In any of the examples described herein, the process may repeat with a given frequency and generate one or more occupancy predictions associated with one or more multiple times in the future for making the determinations above.

FIG. 5 illustrates an example process in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving lidar data from a sensor associated with an autonomous vehicle: inputting the lidar data into a machine learned model: receiving, from the machine learned model, an occupancy prediction associated with an object in an environment of the autonomous vehicle: applying a blur filter to the occupancy prediction to generate a blurred occupancy prediction associated with the object; determining, based at least in part on the occupancy prediction and the blurred occupancy prediction, an intersection probability between the object and the autonomous vehicle at an intersection point at a future time; and controlling the autonomous vehicle in the environment based at least in part on intersection probability.

B: The system of paragraph A, the operations further comprising: normalizing, based at least in part on the object, the blurred occupancy prediction to determine a normalized occupancy prediction; and determining the intersection probability based at least in part on the normalized occupancy prediction.

C: The system of paragraph A or B, the operations further comprising: determining an overlap between a portion of a representation of the autonomous vehicle and a portion of the blurred occupancy prediction, wherein determining the intersection probability is further based at least in part on the overlap.

D: The system of any of paragraphs A-C, wherein: the blur filter is a Gaussian blur algorithm or a uniform blur algorithm.

E: The system of any of paragraphs A-D, wherein the occupancy prediction is a first occupancy prediction, the blurred occupancy prediction is a first blurred occupancy prediction associated with a first time, and the operations further comprising: receiving, from the machine learned model, a second occupancy prediction associated with a second time after the first time; and applying the blur filter to the second occupancy prediction to generate a second blurred occupancy prediction, wherein determining the intersection probability is further based at least in part on the second blurred occupancy prediction.

F: One or more non-transitory computer-readable media storing instructions executable by one or more processors, wherein the instructions, when executed, cause the one or more processors to perform operations comprising: receiving sensor data from a sensor associated with a vehicle: inputting the sensor data to a model: receiving, from the model, an occupancy prediction associated with an object at a future time in an environment of the vehicle: applying a filter to the occupancy prediction to generate a modified occupancy prediction associated with the object: determining, based at least in part on the modified occupancy prediction, an intersection probability between the object and the vehicle; and controlling the vehicle in the environment based at least in part on intersection probability.

G: The one or more non-transitory computer-readable media of paragraph F, the operations further comprising: normalizing the occupancy prediction by the modified occupancy prediction to determine a normalized occupancy prediction; and determining the intersection probability based on the normalized occupancy prediction.

H: The one or more non-transitory computer-readable media of paragraph F or G, the operations further comprising: determining an overlap between a portion of a representation of the vehicle and a portion of the modified occupancy prediction, wherein determining the intersection probability is further based at least in part on the overlap.

I: The one or more non-transitory computer-readable media of any of paragraphs F-H, wherein: the filter is a Gaussian blur algorithm, a uniform blur algorithm, or an adaptive filter.

J: The one or more non-transitory computer-readable media of paragraph I, wherein the adaptive filter is configured to: compare one or more pixel values in the occupancy prediction to a pixel threshold; and modify, using a first filter technique, the one or more pixel values in the occupancy prediction that meet or exceed the pixel threshold: modify, using a second filter technique, the one or more pixel values in the occupancy prediction that are less than the pixel threshold; and the operations further comprising: determining the modified occupancy prediction based at least in part on the first filter technique or the second filter technique.

K: The one or more non-transitory computer-readable media of paragraph J, wherein normalizing the occupancy prediction comprises: identifying a first value of a first pixel associated with the occupancy prediction: identifying a second value of a second pixel associated with the modified occupancy prediction: comparing, as a comparison, the first value and the second value; and outputting a normalized occupancy prediction based at least in part on the comparison.

L: The one or more non-transitory computer-readable media of any of paragraphs F-K, wherein determining the intersection probability comprises: determining an overlap between a representation of the vehicle at the future time and the modified occupancy prediction; and comparing a pixel value associated with the overlap to a threshold.

M: The one or more non-transitory computer-readable media of any of paragraphs F-L, wherein controlling the vehicle comprises performing at least one of a braking action to cause the vehicle to brake, a steering action to cause the vehicle to steer, or an acceleration action to cause the vehicle to accelerate.

N: The one or more non-transitory computer-readable media of any of paragraphs F-M, wherein the model is a first model and applying the filter is by a second model different from the first model.

O: The one or more non-transitory computer-readable media of any of paragraphs F-N, wherein determining the intersection probability comprises: determining a maximum pixel value for a portion of a representation of the vehicle that intersects with a portion of the modified occupancy prediction; and comparing the maximum pixel value to a threshold.

P: The one or more non-transitory computer-readable media of any of paragraphs F-O, wherein: the filter is a multi-dimensional discrete convolution applied over the occupancy prediction.

Q: A method comprising: receiving sensor data from a sensor associated with a vehicle: inputting the sensor data to a model: receiving, from the model, an occupancy prediction associated with an object at a future time in an environment of the vehicle: applying a filter to the occupancy prediction to generate a blurred occupancy prediction associated with the object: determining, based at least in part on the blurred occupancy prediction, an intersection probability between the object and the vehicle; and controlling the vehicle in the environment based at least in part on intersection probability.

R: The method of paragraph Q, further comprising: normalizing the occupancy prediction by the blurred occupancy prediction to determine a normalized occupancy prediction; and determining the intersection probability based on the normalized occupancy prediction.

S: The method of paragraph Q or R, further comprising: determining an overlap between a portion of a representation of the vehicle and a portion of the blurred occupancy prediction, wherein determining the intersection probability is further based at least in part on the overlap.

T: The method of any of paragraphs Q-S, wherein: the filter is a Gaussian blur algorithm, a uniform blur algorithm, or an adaptive filter.

While the example clauses described above are described with respect to one particular implementation, it should be understood that, in the context of this document, the content of the example clauses can also be implemented via a method, device, system, computer-readable medium, and/or another implementation.

Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. One or more non-transitory computer-readable media storing instructions executable by one or more processors, wherein the instructions, when executed, cause the one or more processors to perform operations comprising:
   receiving sensor data from a sensor associated with a vehicle;
   inputting the sensor data to a model;
   receiving, from the model, an occupancy prediction associated with an object at a future time in an environment of the vehicle;
   applying a filter to the occupancy prediction to generate a modified occupancy prediction associated with the object;
   normalizing the occupancy prediction based at least in part on the modified occupancy prediction to determine a normalized occupancy prediction, wherein normalizing the occupancy prediction comprises:
      identifying a first value of a first pixel associated with the occupancy prediction;
      identifying a second value of a second pixel associated with the modified occupancy prediction;
      comparing, as a comparison, the first value and the second value; and
      outputting the normalized occupancy prediction based at least in part on the comparison;

determining, based at least in part on the normalized occupancy prediction, an intersection probability between the object and the vehicle; and controlling the vehicle in the environment based at least in part on the intersection probability, wherein controlling the vehicle comprises performing at least one of a braking action to cause the vehicle to brake, a steering action to cause the vehicle to steer, or an acceleration action to cause the vehicle to accelerate.

2. The one or more non-transitory computer-readable media of claim 1, the operations further comprising:

determining an overlap between a portion of a representation of the vehicle and a portion of the modified occupancy prediction, wherein determining the intersection probability is further based at least in part on the overlap.

3. The one or more non-transitory computer-readable media of claim 1, wherein:

the filter is a Gaussian blur algorithm.

4. The one or more non-transitory computer-readable media of claim 1, wherein determining the intersection probability comprises:

determining an overlap between a representation of the vehicle at the future time and the modified occupancy prediction; and comparing a pixel value associated with the overlap to a threshold.

5. The one or more non-transitory computer-readable media of claim 1, wherein the model is a first model and applying the filter is by a second model different from the first model.

6. The one or more non-transitory computer-readable media of claim 1, wherein determining the intersection probability comprises:

determining a maximum pixel value for a portion of a representation of the vehicle that intersects with a portion of the modified occupancy prediction; and comparing the maximum pixel value to a threshold.

7. The one or more non-transitory computer-readable media of claim 1, wherein:

the filter is a multi-dimensional discrete convolution applied over the occupancy prediction.

8. The one or more non-transitory computer-readable media of claim 1, wherein:

the sensor data is lidar data.

9. The one or more non-transitory computer-readable media of claim 1, wherein:

the model is a machine learned model.

10. The one or more non-transitory computer-readable media of claim 1, wherein:

the filter is one of: a blur filter, a uniform blur algorithm, or an adaptive filter.

11. The one or more non-transitory computer-readable media of claim 1, wherein the occupancy prediction is a first occupancy prediction, the modified occupancy prediction is a first modified occupancy prediction associated with a first time, and the operations further comprising:

receiving, from the model, a second occupancy prediction associated with a second time after the first time; and applying the filter to the second occupancy prediction to generate a second modified occupancy prediction, wherein determining the intersection probability is further based at least in part on the second modified occupancy prediction.

12. A method comprising:

receiving sensor data from a sensor associated with a vehicle;

inputting the sensor data to a model;

receiving, from the model, an occupancy prediction associated with an object at a future time in an environment of the vehicle;

applying a filter to the occupancy prediction to generate a modified occupancy prediction associated with the object;

normalizing the occupancy prediction based at least in part on the modified occupancy prediction to determine a normalized occupancy prediction, wherein normalizing the occupancy prediction comprises:

identifying a first value of a first pixel associated with the occupancy prediction;

identifying a second value of a second pixel associated with the modified occupancy prediction;

comparing, as a comparison, the first value and the second value; and outputting the normalized occupancy prediction based at least in part on the comparison;

determining, based at least in part on the normalized occupancy prediction, an intersection probability between the object and the vehicle; and controlling the vehicle in the environment based at least in part on the intersection probability, wherein controlling the vehicle comprises performing at least one of a braking action to cause the vehicle to brake, a steering action to cause the vehicle to steer, or an acceleration action to cause the vehicle to accelerate.

13. The method of claim 12, further comprising:

determining an overlap between a portion of a representation of the vehicle and a portion of the modified occupancy prediction, wherein determining the intersection probability is further based at least in part on the overlap.

14. The method of claim 12, wherein:

the filter is a Gaussian blur algorithm.

15. A system comprising:

one or more processors; and one or more non-transitory computer-readable media storing instructions executable by the one or more processors, wherein the instructions, when executed, cause the system to perform operations comprising:

receiving sensor data from a sensor associated with a vehicle;

inputting the sensor data to a model;

receiving, from the model, an occupancy prediction associated with an object at a future time in an environment of the vehicle;

applying a filter to the occupancy prediction to generate a modified occupancy prediction associated with the object;

normalizing the occupancy prediction based at least in part on the modified occupancy prediction to determine a normalized occupancy prediction, wherein normalizing the occupancy prediction comprises:

identifying a first value of a first pixel associated with the occupancy prediction;

identifying a second value of a second pixel associated with the modified occupancy prediction;

comparing, as a comparison, the first value and the second value; and outputting the normalized occupancy prediction based at least in part on the comparison;

determining, based at least in part on the normalized occupancy prediction, an intersection probability between the object and the vehicle; and controlling the vehicle in the environment based at least in part on the intersection probability, wherein controlling the vehicle comprises performing at least one of a braking action to cause the vehicle to brake, a steering action to cause the vehicle to steer, or an acceleration action to cause the vehicle to accelerate.

16. The system of claim 15, the operations further comprising:
determining an overlap between a portion of a representation of the vehicle and a portion of the modified occupancy prediction,
wherein determining the intersection probability is further based at least in part on the overlap.

17. The system of claim 15, wherein:
the filter is a Gaussian blur algorithm.

18. The system of claim 15, wherein determining the intersection probability comprises:
determining an overlap between a representation of the vehicle at the future time and the modified occupancy prediction; and
comparing a pixel value associated with the overlap to a threshold.

19. The system of claim 15, wherein the model is a first model and applying the filter is by a second model different from the first model.

20. The system of claim 15, wherein determining the intersection probability comprises:
determining a maximum pixel value for a portion of a representation of the vehicle that intersects with a portion of the modified occupancy prediction; and
comparing the maximum pixel value to a threshold.

* * * * *